(12) United States Patent
Mann, III et al.

(10) Patent No.: US 8,047,555 B2
(45) Date of Patent: Nov. 1, 2011

(54) AIRPLANE GROUND SUPPORT EQUIPMENT CART HAVING EXTRACTABLE MODULES AND A GENERATOR MODULE THAT IS SEPERABLE FROM POWER CONVERSION AND AIR CONDITIONING MODULES

(75) Inventors: James W. Mann, III, Saint Petersburg, FL (US); Jeffrey E. Montminy, Riverview, FL (US)

(73) Assignee: Illinois Tool Works Inc., Glenview, IL (US)

( * ) Notice: Subject to any disclaimer, the term of this patent is extended or adjusted under 35 U.S.C. 154(b) by 492 days.

(21) Appl. No.: 12/250,489

(22) Filed: Oct. 13, 2008

(65) Prior Publication Data

US 2009/0108552 A1   Apr. 30, 2009

Related U.S. Application Data

(60) Provisional application No. 60/984,005, filed on Oct. 31, 2007, provisional application No. 60/984,006, filed on Oct. 31, 2007, provisional application No. 60/984,010, filed on Oct. 31, 2007, provisional application No. 61/036,749, filed on Mar. 14, 2008.

(51) Int. Cl.
*B62B 3/04* (2006.01)
(52) U.S. Cl. .................................. 280/79.2; 280/79.11
(58) Field of Classification Search ............... 280/47.34, 280/47.35, 79.11, 79.2
See application file for complete search history.

(56) References Cited

U.S. PATENT DOCUMENTS

| | | | |
|---|---|---|---|
| 3,777,506 A | * | 12/1973 | Hergatt et al. .................. 62/237 |
| 4,272,967 A | | 6/1981 | White et al. |
| 4,370,868 A | | 2/1983 | Kim |
| 4,632,019 A | * | 12/1986 | Whiteman ...................... 454/76 |
| 4,653,580 A | | 3/1987 | Steele |
| 4,986,555 A | * | 1/1991 | Andreen .................... 280/47.35 |
| 4,993,145 A | | 2/1991 | Gray |
| 5,023,791 A | | 6/1991 | Herzberg et al. |

(Continued)

FOREIGN PATENT DOCUMENTS

DE    29702259 U1    6/1997

(Continued)

OTHER PUBLICATIONS

PCT/US2008/081072—International Search Report. dated Mar. 26, 2009.

(Continued)

*Primary Examiner* — Jeffrey J Restifo
(74) *Attorney, Agent, or Firm* — Perry Hoffman

(57) ABSTRACT

A ground support equipment cart contains one or more removable equipment modules. The cart contains a rectangular module containing airplane air conditioning components mounted upon the cart and extending the width of the cart but occupying substantially less than half of the cart's length. The cart also contains one or more rectangular equipment modules removably mounted upon the cart, one or two of the removable modules containing electrical power converting components. And the cart contains a rectangular module containing power generating components mounted upon the cart and occupying substantially the remainder of the cart. The cart separates into two parts, one part containing the module containing power generating components. The cart also contains a control module having a display and controls for, and that is networked to, the other modules. One or more of the removable modules slide out on a tray and may be locked in position.

20 Claims, 14 Drawing Sheets

U.S. PATENT DOCUMENTS

| | | | |
|---|---|---|---|
| 5,031,690 | A | 7/1991 | Anderson et al. |
| 5,247,804 | A | 9/1993 | Paige |
| 5,355,024 | A | 10/1994 | Elliott et al. |
| 5,386,147 | A | 1/1995 | Bonneau et al. |
| 5,495,809 | A * | 3/1996 | Carbo .................. 105/157.1 |
| 5,701,760 | A | 12/1997 | Torigoe et al. |
| 5,702,115 | A * | 12/1997 | Pool ...................... 280/47.35 |
| 5,757,633 | A | 5/1998 | Bowles |
| 5,947,494 | A * | 9/1999 | Thogersen et al. .......... 280/79.2 |
| 6,073,942 | A * | 6/2000 | Heneveld, Sr. .......... 280/33.991 |
| 6,320,773 | B1 | 11/2001 | Urish et al. |
| 6,424,891 | B1 | 7/2002 | Sargent et al. |
| 6,964,296 | B2 | 11/2005 | Memory |
| 6,988,538 | B2 | 1/2006 | Merkys |
| 7,032,313 | B2 | 4/2006 | Memory |
| 7,044,200 | B2 | 5/2006 | Gupte |
| 7,152,670 | B2 | 12/2006 | Dobbs |
| 7,254,956 | B2 | 8/2007 | Matonog |
| 7,257,958 | B2 | 8/2007 | Bush |
| 7,322,203 | B2 * | 1/2008 | Widegren ..................... 62/97 |
| 7,412,840 | B2 * | 8/2008 | Leathers ..................... 62/208 |
| 7,556,271 | B2 * | 7/2009 | Robbins et al. .......... 280/47.35 |
| 7,651,052 | B2 * | 1/2010 | Delort ............................ 244/58 |
| 2005/0067137 | A1 | 3/2005 | Barnwell |
| 2005/0161202 | A1 | 7/2005 | Merkys et al. |
| 2006/0201173 | A1 | 9/2006 | Leathers |
| 2007/0209383 | A1 | 9/2007 | Hutton |
| 2007/0217572 | A1 * | 9/2007 | Kotowski et al. ............. 378/57 |
| 2007/0235587 | A1 * | 10/2007 | Delort .................. 244/114 R |
| 2008/0250803 | A1 * | 10/2008 | Leadingham et al. .......... 62/236 |
| 2009/0107159 | A1 * | 4/2009 | Mann et al. ..................... 62/239 |
| 2009/0107160 | A1 * | 4/2009 | Montminy et al. ............. 62/239 |
| 2009/0107657 | A1 * | 4/2009 | Montminy et al. ...... 165/104.31 |
| 2009/0108549 | A1 * | 4/2009 | Montminy et al. ......... 280/47.34 |
| 2009/0108552 | A1 * | 4/2009 | Mann et al. ................. 280/79.3 |
| 2009/0112368 | A1 * | 4/2009 | Mann et al. .................... 700/275 |
| 2011/0048572 | A1 * | 3/2011 | Batson et al. ..................... 141/1 |

FOREIGN PATENT DOCUMENTS

| | | |
|---|---|---|
| FR | 2897340 A | 8/2007 |
| GB | 2150278 A | 6/1985 |
| GB | 2428651 A | 6/1985 |
| WO | 2005124990 A2 | 12/2005 |
| WO | 2007061622 A1 | 5/2007 |

OTHER PUBLICATIONS

PCT/US2008/081072—Written Opinion of the International Searching Authority. dated Mar. 26, 2009.

PCT/US2008/081072—Notification of Transmittal of the International Search Report and the Written Opinion of the International Searching Authority or the Declaration.Mar. 26, 2009.

PCT/US2008/080871—International Search Report. dated Mar. 25, 2009.

PCT/US2008/080871—Written Opinion of the International Searching Authority. dated Mar. 25, 2009.

PCT/US2008/080871—Notification of Transmittal of the International Search Report and the Written Opinion of the International Searching Authority or the Declaration. Mar. 25, 2009.

PCT/US2008/081081—International Search Report. dated Mar. 25, 2009.

PCT/US2008/081081—Written Opinion of the International Searching Authority. dated Mar. 25, 2009.

PCT/US2008/081081—Notification of Transmittal of the International Search Report and the Written Opinion of the International Searching Authority or the Declaration. Mar. 25, 2009.

PCT/US2008/080709—International Search Report. dated Feb. 3, 2009.

PCT/US2008/080709—Written Opinion of the International Searching Authority. dated Feb. 3, 2009.

PCT/US2008/080709—Notification of Transmittal of the International Search Report and the Written Opinion of the International Searching Authority or the Declaration.Feb. 3, 2009.

* cited by examiner

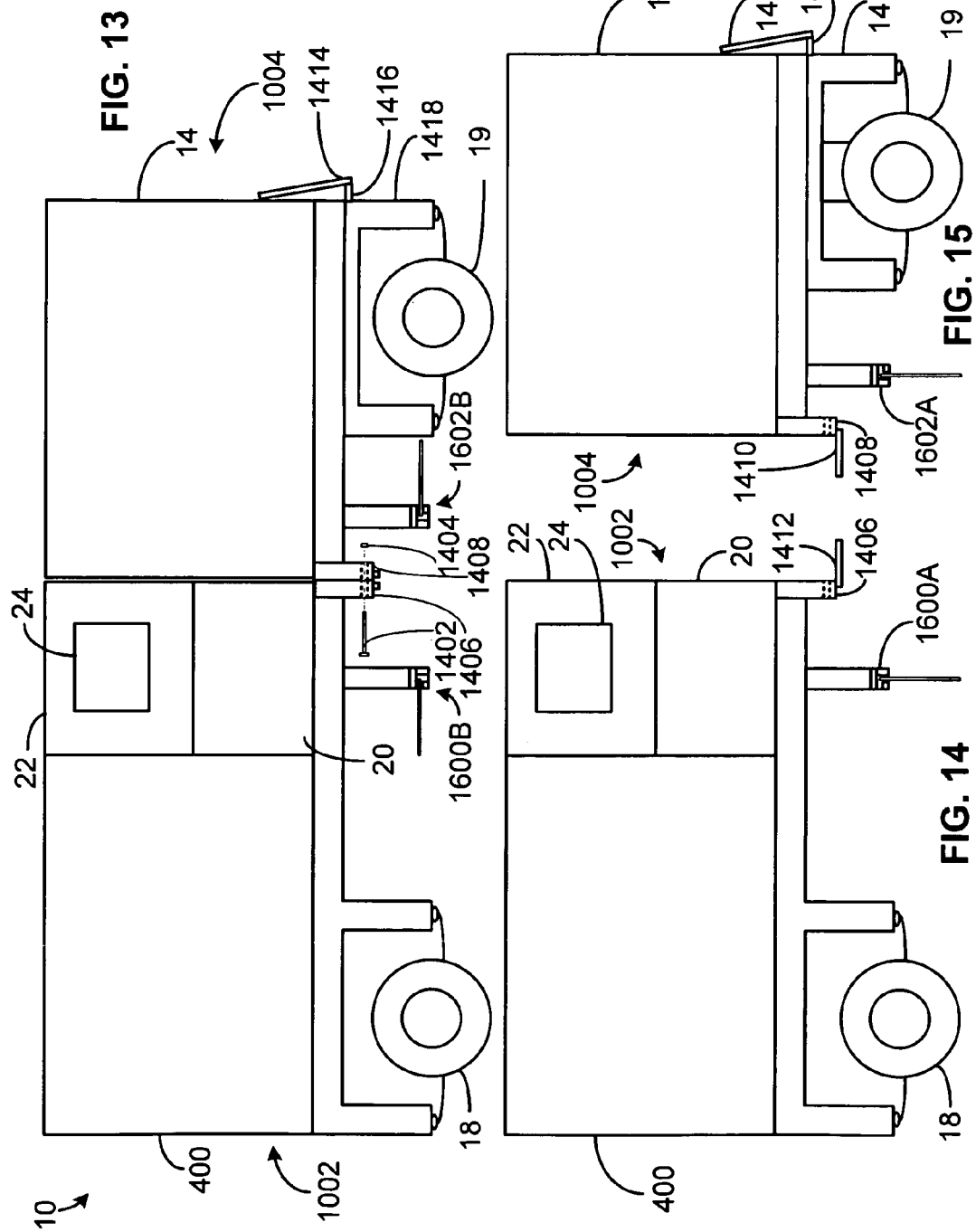

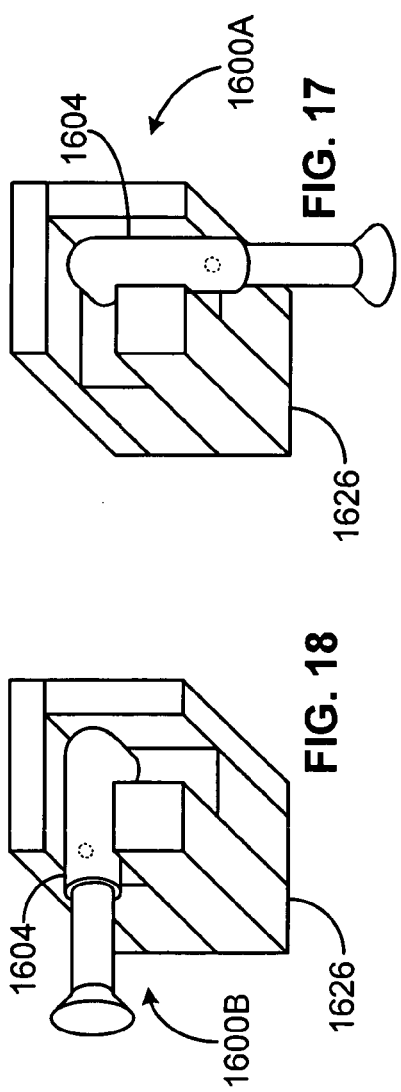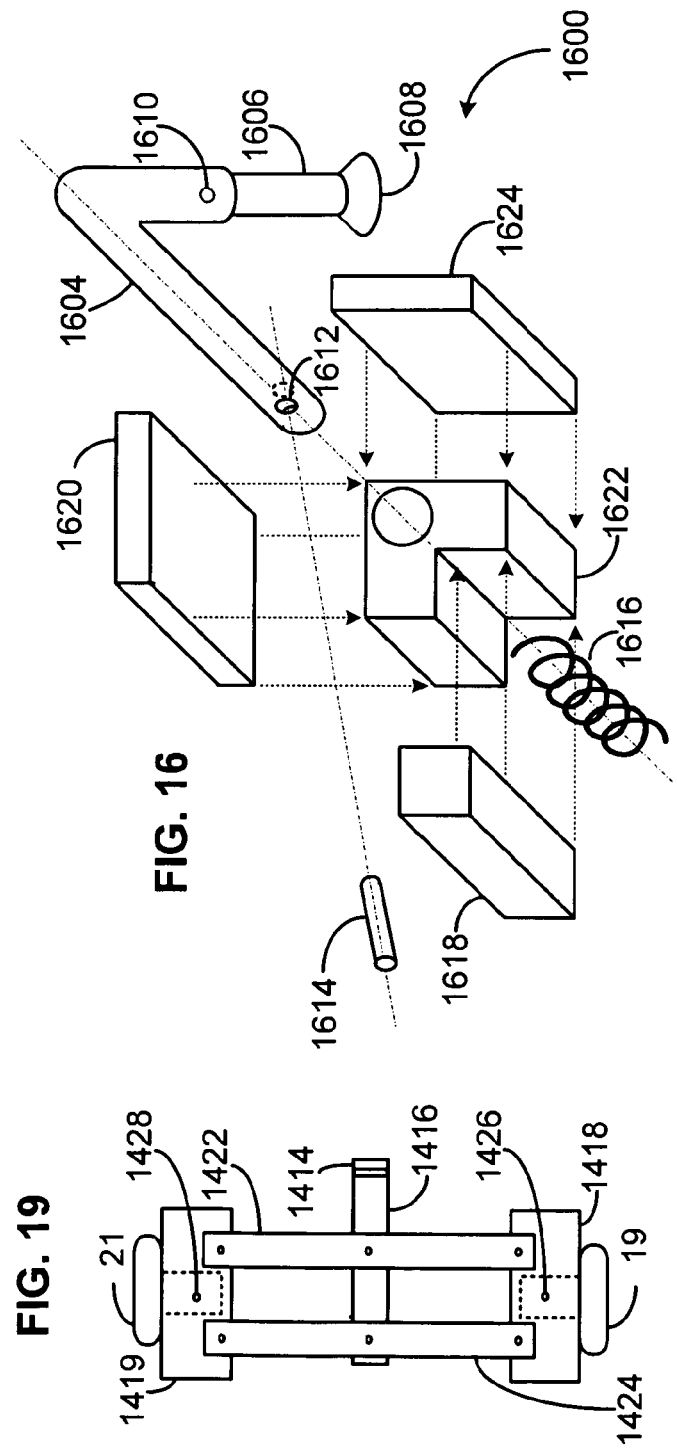

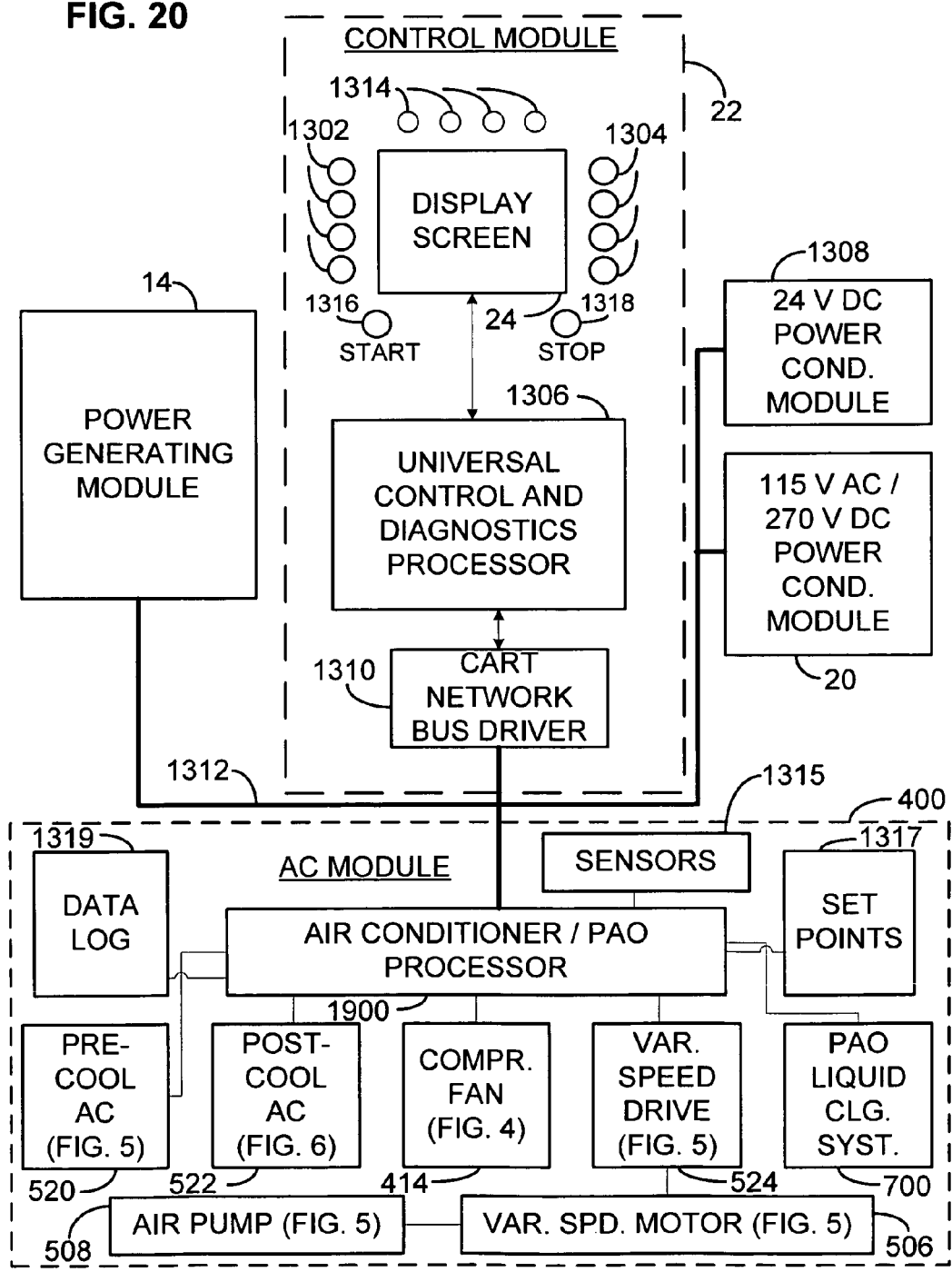

US 8,047,555 B2

AIRPLANE GROUND SUPPORT EQUIPMENT CART HAVING EXTRACTABLE MODULES AND A GENERATOR MODULE THAT IS SEPERABLE FROM POWER CONVERSION AND AIR CONDITIONING MODULES

This application is a non provisional of provisional application Ser. No. 60/984,005 filed Oct. 31, 2007, provisional application Ser. No. 60/984,006 filed Oct. 31, 2007, provisional application Ser. No. 60/984,010 filed Oct. 31, 2007, and provisional application Ser. No. 61/036,749 filed Mar. 14, 2008.

CROSS-REFERENCE TO RELATED APPLICATIONS

The present patent application is one of a set of commonly owned applications filed on the same day as the present application, sharing some inventors in common, and relating to airplane ground support equipment and carts. The other applications in this set, listed here, are hereby incorporated by reference into the present application: "A Multi-Voltage Power Supply for a Universal Airplane Ground Support Equipment Cart," James W. Mann, III and David Wayne Leadingham (US 2009/0121552 A1); "An Adjustable Cooling System for Airplane Electronics," Jeffrey E. Montminy and Steven E. Bivens (US 2009/0107657 A1); "A Frame and Panel System for Constructing Modules to be Installed on an Airplane Ground Support Equipment Cart," Jeffrey E. Montminy, Brian A. Teeters, and Kyta Insixiengmay (US 2009/0108549 A1); "A System of Fasteners for Attaching Panels onto Modules that are to be Installed on an Airplane Ground Support Equipment Cart," Jeffrey E. Montminy, Brian A. Teeters, and Kyta Insixiengmay (US 2009/0110471 A1); "An Adjustable Air Conditioning Control System for a Universal Airplane Ground Support Equipment Cart," James W. Mann, III, Jeffrey E. Montminy, Benjamin E. Newell, and Ty A. Newell (US 2009/0107159 A1); "A Compact, Modularized Air Conditioning System that can be Mounted Upon an Airplane Ground Support Equipment Cart," Jeffrey E. Montminy, Kyta Insixiengmay, James W. Mann, III, Benjamin E. Newell, and Ty A. Newell (US 2009/0107160 A1); and "Maintenance and Control System for Ground Support Equipment," James W. Mann, III, Jeffrey E. Montminy, Steven E. Bivens, and David Wayne Leadingham (US 2009/0112368 A1).

BACKGROUND OF THE INVENTION

1. Field of the Invention

The present invention relates generally to the field of airplane ground support equipment and more specifically to airplane ground support equipment having extractable modules.

2. Description of the Related Art

When an airplane is on the ground with its engines shut down, the airplane is typically unable to provide power for its electrical systems and chilled air for its air conditioning systems; and some airplanes are also unable to provide liquid coolant for some critical electronic (or "avionic") components. It is customary to connect such a grounded airplane to an airplane ground support equipment system. Such a system may have its components mounted upon a mobile equipment cart that is called an airplane ground support equipment cart and that may be parked, placed or mounted conveniently close to an airplane requiring ground support. Such a cart typically contains an air conditioner that can provide conditioned and cooled air to an airplane plus an electrical power converter that can transform power drawn from the local power grid into power of the proper voltage (AC or DC) and frequency required by the airplane. Such an airplane ground support equipment cart may also contain a diesel engine connected to an electrical generator that enables the cart to provide both air conditioning and also electrical power for an airplane without any connection to the local power grid. And if an airplane requires a source of cooled liquid for its electronics, some carts may also include a source of liquid coolant.

In the past, particularly with regard to military airplanes, such ground support equipment carts have been custom designed to meet the specialized needs of a single particular type or class of airplane. Hence, a cart designed to support the specific requirements and needs of a first type or class of airplane cannot be used to support the differing specific requirements and needs of other types or classes of airplanes. Different airplanes typically may require different pressures and volumes of cooled air, different amounts of electrical power, different electrical voltage levels, and different electrical frequencies (or direct current). And different airplanes typically may require differing pressures and volumes of cooled liquid for use in cooling onboard electronics. Accordingly, every airport must be supplied with as many different types of ground support equipment carts as there are different types or classes of airplanes that may land and take off at each airport or military base. Problems arise when more airplanes of a particular type arrive at a specific location than there are ground support equipment carts suitably designed to service the needs of that particular type or class of airplane.

As an example of an airplane cart arrangement that provides air and electrical conditioning for an airplane, PCT patent application No. PCT/US2006/043312 (Intl. Pub. No. WO 2007/061622 A1 published on May 31, 2007) discloses an airplane ground support cart that has a modular design of its electrical conditioning components. This cart provides air conditioning and electrical power conditioning as well as optional electrical power generation services to airplanes. FIG. 5 reveals that the cart disclosed in this patent application may receive interchangeable, modular power conversion modules. Thus, a module 72, which generates 3-phase 115 volt 400 Hz A.C. power, may be removed and replaced with a module 78, which generates 270 volt D.C. power. FIG. 6 illustrates that this cart may also accept a module 92, which generates 28 volt D.C. electrical power.

FIG. 2 of the above PCT patent application illustrates a typical arrangement of the mechanical components of a dual air conditioning system within an airplane ground support equipment cart 14. The air conditioner's mechanical components are spread all across the entire length of the cart 14. Two sets of condenser coils 34 are positioned at one end of the cart 14; and the thickness of the coils 34 and their housing, together with the thickness of the associated cooling fans, occupies roughly one-fifth of the cart's overall length. A filter and upstream evaporation coil 30 and a downstream evaporation coil 40 and outlet connection 42 (to which can be attached a duct leading to an airplane) are positioned at the other extreme end of the cart 14, occupying somewhat less than one-fifth of the cart's overall length. A blower fan 32, a discharge plenum 38, and two compressors 36 are shown positioned in the central portions of the cart 14. These mechanical components of the air conditioning system are not confined within a rectangular module within a portion of the volume of the cart 14—these components are spread all across the cart 14 and thus cannot be conveniently removed from the cart for servicing or for use away from the cart 14.

Other cart components, such as a diesel engine 54 and generator 56 (shown in FIG. 4 of the PCT application) and an electrical power converter unit 72 (shown in FIG. 5 of the PCT application) are squeezed in among the air conditioning components wherever there is room. This intermixing of non-air-conditioning components with the air-conditioning components greatly complicates servicing of all the components, since they are all crowded into the same cramped space. A service man working on the air conditioner compressors or blowers may find the diesel engine 54 and generator 56 are in the way of these components, for example.

The present invention has as its goal the realization of modules of similar design, both large and small, that may be installed on such a cart, interchanged with one another, and removed for convenient servicing. Larger modules might contain air conditioning equipment or power generation equipment, while smaller modules may contain power conversion equipment, such as units that can convert 3-phase 460 volt 60 Hz A.C. incoming power into 270 volts DC or 115 volts 400 Hz A.C. Other modules may contain control panels and displays and computers and other such equipment.

These modules should be strong enough so that they may be lifted and moved about without damage. They should be relatively easy to disassemble so that repairs can be carried out without great difficulty, but there should be no loose parts that could be sucked up into a jet turbine engine, causing serious damage. The module design should lend itself readily to electromagnetic shielding when necessary. They should be relatively water and weather resistant, but there should be a minimum of internal enclosed channels where moisture could collect and do serious damage. The design of these modules should scale easily up or down into large or small modules as required by the nature of the ground support equipment being housed.

SUMMARY OF THE INVENTION

The invention is embodied in a ground support equipment cart containing one or more removable equipment modules. The cart contains a rectangular module containing airplane air conditioning components mounted upon the cart and extending the width of the cart but occupying substantially less than half of the cart's length. The cart also contains one or more rectangular equipment modules removably mounted upon the cart, one or two of the removable modules containing electrical power converting components. And the cart contains a rectangular module containing power generating components mounted upon the cart and occupying substantially the remainder of the cart. In one embodiment, the cart separates into two parts, one part containing the module containing power generating components. In another embodiment, the cart also contains a control module having a display and controls for, and that is networked to, the other modules. In yet another embodiment, one or more of the removable modules slide out on a tray and may be locked in position.

BRIEF DESCRIPTION OF THE DRAWINGS

FIG. 13 is a front view of the equipment cart illustrating in more detail its supporting wheels and trucks, its supporting jack stands (in their horizontal, resting positions), and the way in which the rear portion of the cart which supports the air conditioning, electrical power conversion, and control modules is attached to the front portion of the cart which supports the power generation module.

FIG. 14 is a front view of the rear portion of the cart in FIG. 13 shown separated from the front portion and having its supporting jack stands extended downward to support and stabilize the rear portion when it is standing by itself.

FIG. 15 is a front view of the front portion of the cart in FIG. 13 shown separated from the rear portion and having the its supporting jack stands extended downward to support and stabilize the front portion when it is standing by itself.

FIG. 16 is an exploded, oblique front view of one of the supporting jack stands and its mounting block illustrating all the components of the jack stand and its mounting block.

FIG. 17 is an oblique front view of one of the supporting jack stands and its supporting block with the supporting jack stand rotated to its vertical, load bearing position.

FIG. 18 is an oblique front view of the supporting jack stand and its supporting block shown in FIG. 17 but with the supporting jack stand rotated to its horizontal, resting position.

FIG. 19 is a plan view of the cart's two front truck and wheel assemblies (with the rest of the cart removed) illustrating the two horizontal bars that connect the towing bar and the left and right front wheel trucks together in a parallelogram manner to provide for steering of the 4-wheel cart's front wheels by means of the towing bar.

FIG. 20 is a block diagram illustrating a signal-carrying bus which interconnects the power generating module, two power conversion modules, and the air conditioning module with the control module, and further illustrating the control module's operator menu display and its associated signal lamps and control pushbuttons.

DETAILED DESCRIPTION OF THE INVENTION

Figure 1:
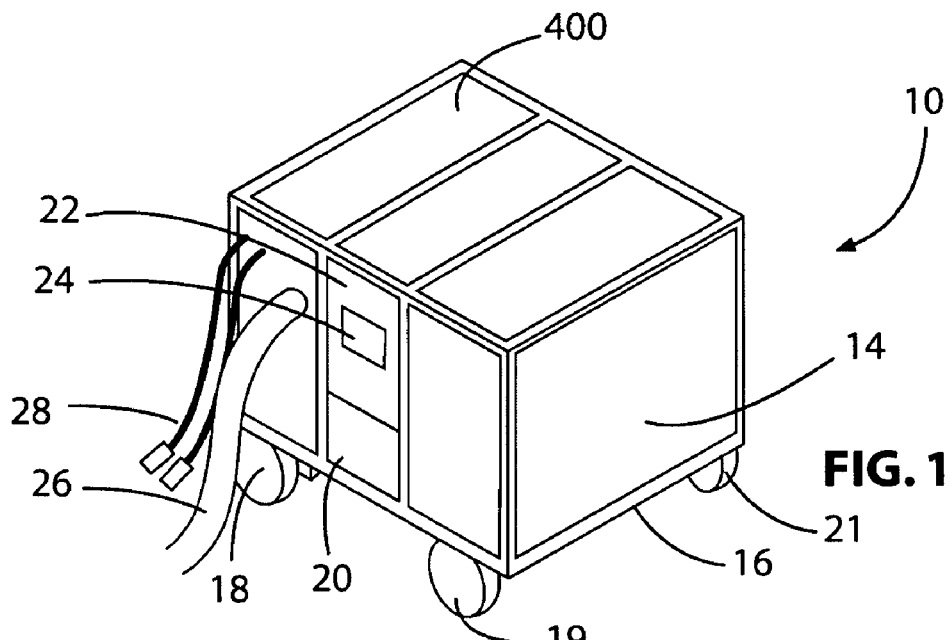
FIG. 1 is an isometric view of an airplane ground support equipment cart including an electric power conversion module that can be detached from the cart and a power generating module that can slide out of the cart for service or removal.

A. Modular and Universal Airplane Ground Support Equipment Cart

Airplane ground support equipment carts are wheeled, towable carts or fixed mounted (permanently or temporarily) devices that provide air conditioning, avionics equipment liquid cooling, and electrical power conversion and generation services to airplanes whose engines are shut down. These carts preferably should be conveyed by military and other airplanes to airports and military bases all over the world, so it would be convenient and an advantage to have this equipment be no larger than a standard military equipment conveyance palette. However, many such carts today do not fit one standard palette, and this reduces the numbers of ground support equipment that is available in the field. Traditionally, such ground support equipment carts are custom-designed—they provide such services to only one type or class of airplane. Hence, different carts must be provided for each different type of airplane. Also traditionally, the air conditioning components mounted on such carts are so bulky that they occupy the entire area of the cart, making it necessary to sandwich electrical power conversion and other components wherever there is room and thereby making it extremely awkward to service or replace such cart-mounted components.

The present invention is embodied in a universal airplane ground support equipment cart—universal in the sense that it is designed to service the varied needs of a variety of types and classes of airplanes, rather than just one type or class. This ground support equipment cart is also modular—its components are rectangular modules that may be easily separated or removed from the cart for service or exchange. The modules may also be used independently of the cart, and modules not needed for a particular type of airplane may be readily removed and used elsewhere, standing by themselves, in a highly flexible manner. Such a cart 10 and several of its modules—an electrical power generation module 14, an electrical power conversion module 20, and a dual air conditioning module 400 (which also provides PAO liquid cooling)—are illustrated in simplified form in FIGS. 1-3. (Much more detailed drawings of these components are included in this application and also in the related applications cited above).

In use, the cart 10 is mounted near or drawn up to an airplane (not shown) by a suitable tractor or truck (not shown). An operator connects an air conditioning plenum or air duct 26 from the dual air conditioning module 400 to a cooled air input port (not shown) on the airplane. And if the airplane has avionics or other electronic components that require a supply of liquid coolant, then the operator also connects a pair of PAO liquid coolant conduits 28 from the air conditioning module 400 to a pair of PAO ports on the airplane. The operator then uses a suitable electrical power cable (not shown) to connect an electrical power output port or receptacle (not shown in FIGS. 1-3) on the electrical power conversion module 20 to a matching port or cable on the airplane. To supply the varying needs of different types of airplanes, there may be as many as two electrical power conversion modules 20 the cart 10, a first module 20 having both a 115 volt, 400 Hz AC power output port and also a separate 270 volt DC power output port, and a second module 1308 (FIG. 20) having a 28 volt DC power output port (one or the other of these modules 20 or 1308 may be removed from the cart 10).

Figure 22:
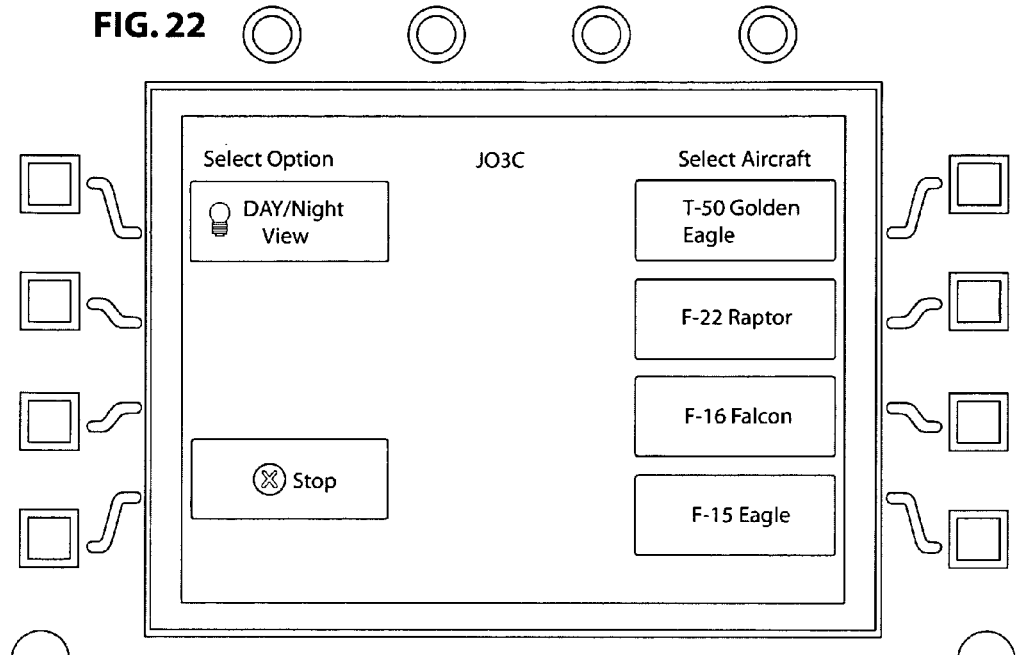
FIG. 22 presents a view of a main menu that is normally displayed on the control module's display together with the signal lamps and pushbutton controls which surround the display which together permit one to specify what type or class of airplane is to be serviced.

Next, with reference to FIG. 20, the operator depresses a "Start" pushbutton 1316 on the front panel of a control module 22 having a display screen 24 that then displays a main menu such as that shown in FIG. 22. If the airplane is a T-50 Golden Eagle, the operator depresses one of four pushbuttons 1304 that is adjacent the label "T-50 Golden Eagle" on this menu (FIG. 22), and then the operator depresses one of four pushbuttons 1302 that is adjacent the label "Start" on a "T-50" menu (FIG. 23) that then appears. In response, all of the modules automatically reconfigure themselves as needed to service this specific type of airplane with air conditioning of the proper pressure and volume of air, with electrical power of the proper type, voltage, and frequency, and with liquid coolant (if needed). If the operator selects the wrong type of airplane, pressure and air flow measurements can detect this and shut down the system, illuminating a colored status light 1314 to signal an error and displaying an appropriate error message on the control panel 24 to the operator. The system is halted when the operator depresses a "Stop" pushbutton 1318 on the front of the control 22 or a pushbutton 1302 or 1304 that is adjacent the label "Stop" on one of the display screen 24 menus.

A universal airplane ground support equipment cart is designed to provide flexible support for the needs of many different types and classes of airplanes having widely varying air conditioning and liquid cooling and electrical power support needs. The present invention can provide different pressures and volumes of cooled air and cooled liquid to different airplanes, and it can provide different types and quantities of electrical power to different airplanes. It also provides a simplified, integrated control panel where airplane service personnel can simply select the type of airplane that is to be serviced and have the various appliances on the cart automatically configured to optimize the support for that particular type of airplane.

A modular airplane ground support equipment cart is one where the different support systems provided by the cart are each confined to rugged, compact, optionally EMI shielded, rectangular modules that may be easily removed, serviced, replaced, and used stand-alone separate from the cart and its other modular components.

In the cart 10, for example, a two-stage air conditioning module 400 contains all of the air conditioning components of the cart 10, including a liquid PAO cooling system. An electrical power converter module 20 contains the power conversion components of the cart 10, including a 270 volt D.C. supply and a 115 volt 400 Hz A.C. supply; and the module 20 may be replaced or supplemented with another module 1308 that includes a 28 volt D.C. supply, providing up to three different types of electrical power conversion in accordance with the specialized needs of different types and classes of airplanes.

Figure 2:
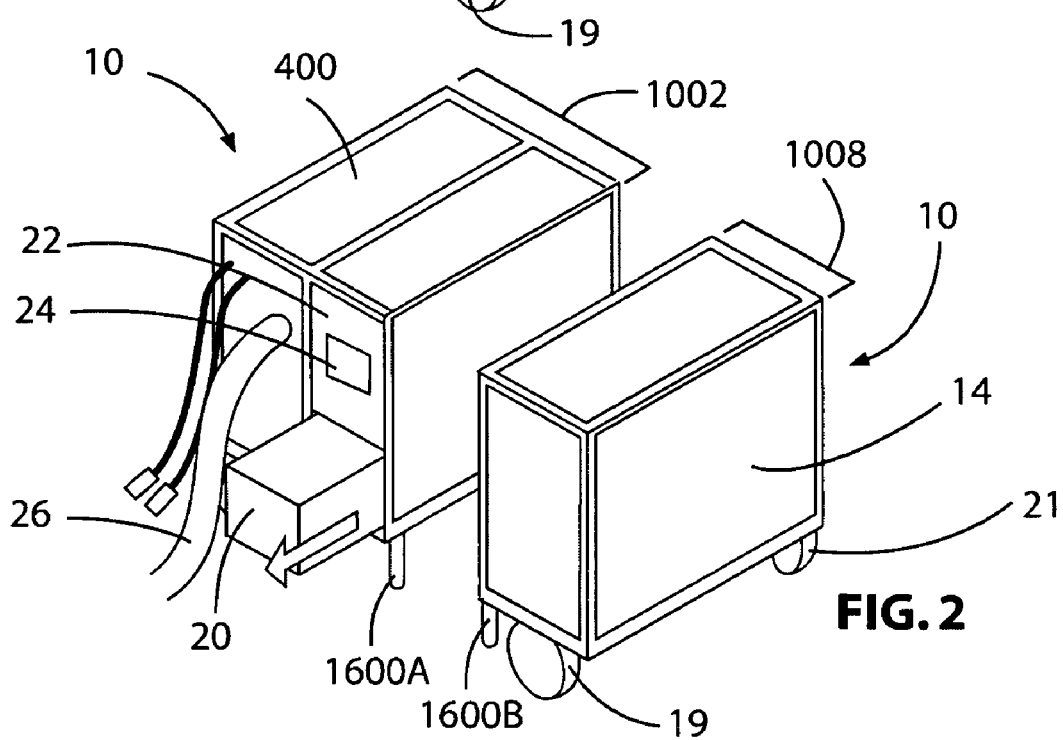
FIG. 2 is an isometric view of the cart shown in FIG. 1 with the power generation module separated from the other elements of the cart.

A power supply module 14 contains a diesel engine and a generator for producing 60 cycle, three-phase, 460 volt electrical power when the cart cannot be conveniently hooked up to a 360 to 500 volt, 50 or 60 cycle A.C., three phase supply provided by the local power grid. The power supply module 14 is confined to one end of the cart 10 and may be detached from the cart 10, as is illustrated in FIG. 2.

Any or all of these modules 14, 20, 400, and 1308 may optionally be equipped with an internal transformer (not shown) that transforms the incoming high voltage electrical power down to 120 volts or 240 volts at 50- or 60-Hz and feeds this low voltage to standard, weather protected outlets (not shown) which can be used to provide power to hand tools and to portable lighting equipment and the like, with ground fault protection also provided to these appliances.

Figure 23:
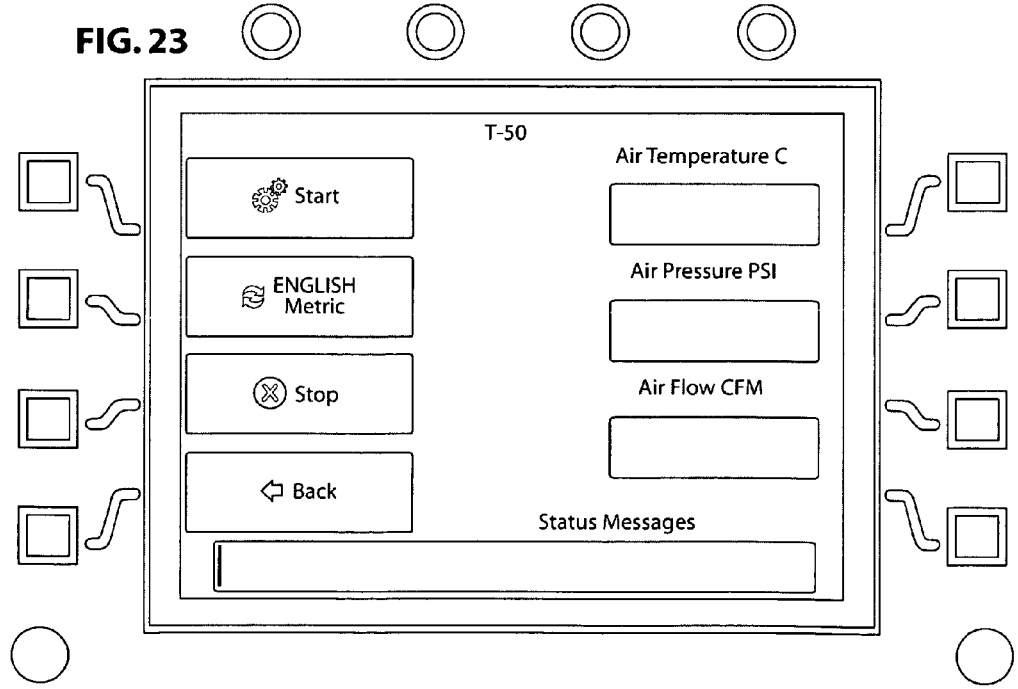
FIG. 23 presents a view of a menu for a particular airplane that appears when that particular airplane is selected on the main menu shown in FIG. 22.

As is illustrated in FIG. 20, a control module 22 is mounted on the cart 10 above the power converter module 20. The control module 22 has on its front panel a pair of start and stop pushbuttons 1316 and 1318, colored status lights 1314, and a display screen 24 having sets of four pushbuttons 1302 and 1304 positioned adjacent the display screen 24's left and right sides. When turned on, the display screen 24 presents a main menu display, shown in FIG. 22, which permits airplane maintenance personnel to select the type or class of airplane that is to be serviced by depressing one of the adjacent pushbuttons 1302 and 1304. In response, a menu specific to that type or class of airplane appears (FIG. 23). A maintenance menu and related submenus (FIG. 21) permits service personnel to view and (in some cases) to alter the state of the air conditioning and PAO module 400, the electrical power converter modules 20 and 1308, and the power supply module 14.

Referring again to FIG. 20, all of the modules 14, 20, 22, 400, and 1308 are networked together by a network 1312 when they are installed upon the cart 10. In addition, each of the modules 14, 20, 22, 400, and 1308 is equipped with a network jack (not shown) that can be connected to an external portable computer (not shown) which can then serve as a replacement control module and display for all of the modules, with mouse clicks on the menus shown in FIGS. 21-23 replacing depressions of the pushbuttons 1302 and 1304.

Figure 3:
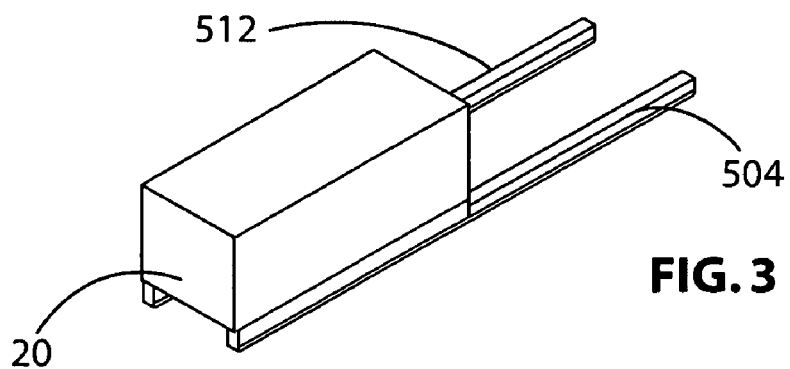
FIG. 3 is an isometric view of the electric power conversion module shown in FIG. 1 and FIG. 2 to illustrate how it is mounted on tracks to slide away from the cart for maintenance purposes and for removal.

The rear portion 1002 of the cart 10 is optionally mounted upon a 2-wheel-and-axle truck assembly 18, and the front portion 1004 of the cart 10 is mounted upon two independent, steerable wheel and truck assemblies 19 and 21. In the space on the cart 10 between the power generation module 14 and the two-stage air conditioning module 400, one or both of the electrical power converter modules 20 and 1308 may be slid into place on tracks 504 and 512 and thereby attached to the cart 10, as is illustrated in FIGS. 2 and 3. Both of the modules 20 and 1308 may be installed on directly opposite sides of the cart 10, as shown, with the control module 22 and display 24 mounted directly over one of the two modules 20 or 1308.

The cart 10 is designed so that when it is fully configured with the various modules, as shown in FIG. 1, it takes up no more than one "pallet" position on an air transport cargo airplane. A pallet position is described in *MIL-STD*-1366D *Interface Standard for Transporting Criteria*, paragraph 5.4.4.2—463 L cargo handling system—which reads:

"This is the standard military cargo system. The 463 L cargo system includes airplane specific equipment and airfield material handling equipment (MHE). The 463 L cargo pallet is a major part of the system. The 10,000-pound (4535 kg) capacity 463 L cargo pallet has a flat aluminum deck ~84" by ~104" (~2.1 m by ~2.6 m) (88" by 108" (2.2 m×2.7 m) overall including fixed locking lugs)."

If the power generation module 14 is not required for a particular airplane support task, the module 14 and the wheel and truck assemblies 19 and 21 beneath the module 14 may be completely detached from the rest of the cart 10, as is illustrated in FIG. 2, and removed to be used entirely separately elsewhere, wherever a portable source of 60 Hz, 460 volt, three-phase power is needed. Deployable jack stands 1600A and 1602A enable the front portion 1004 and the rear portion 1002 of the cart 10 to remain standing when the 4-wheel cart 10 is thus split into two 2-wheel carts in this manner.

As illustrated in FIGS. 2 and 3, the electrical power converter modules 20 and 1308 may be slid out on the tracks 504 and 512 and locked in position to give service personnel convenient access to these modules for the servicing of these modules 20 and 1308 and their internal electrical and electronic components. They may also be removed for repair or for use elsewhere as stand-alone power converters, or they may be replaced with different power converter modules that generate different voltages and frequencies as needed for servicing different airplanes.

B. Modules Extractable from and Separable from an Airplane Ground Support Equipment Cart Referring now to FIGS. 4 and 5, the platform of the cart 10 is shown as if it were a simple flat plate—the wheels and trucks are not shown. The frame cover plates for the individual modules are shown removed (or transparent) to present a simplified view of what each module contains internally.

Figure 4:
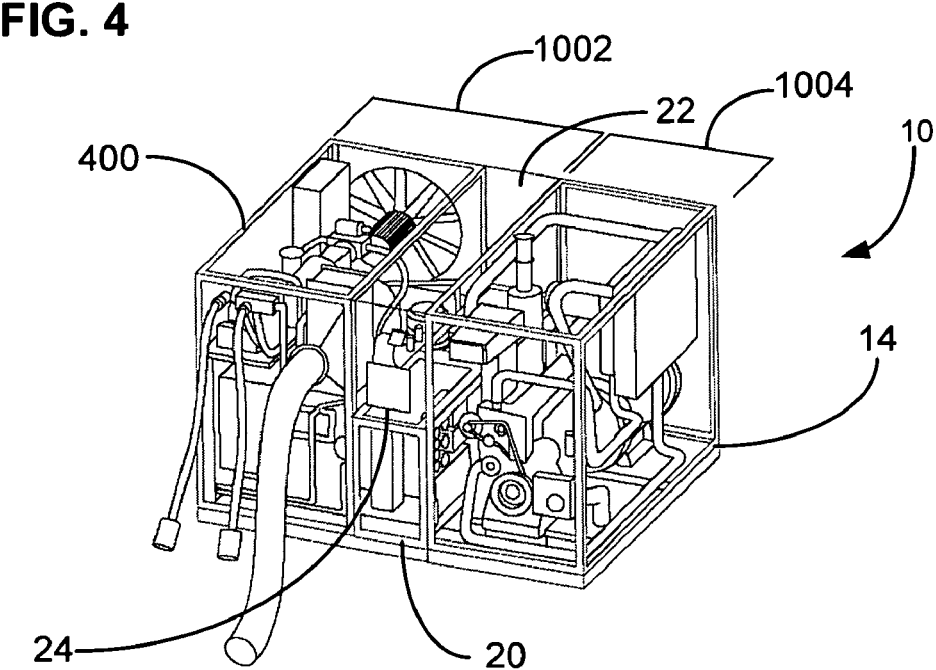
FIG. 4 is a perspective view of a variety of modules shown with the module side panels removed (to reveal internal details) and positioned closely together as they would be arranged on a ground support equipment cart.
Figure 5:
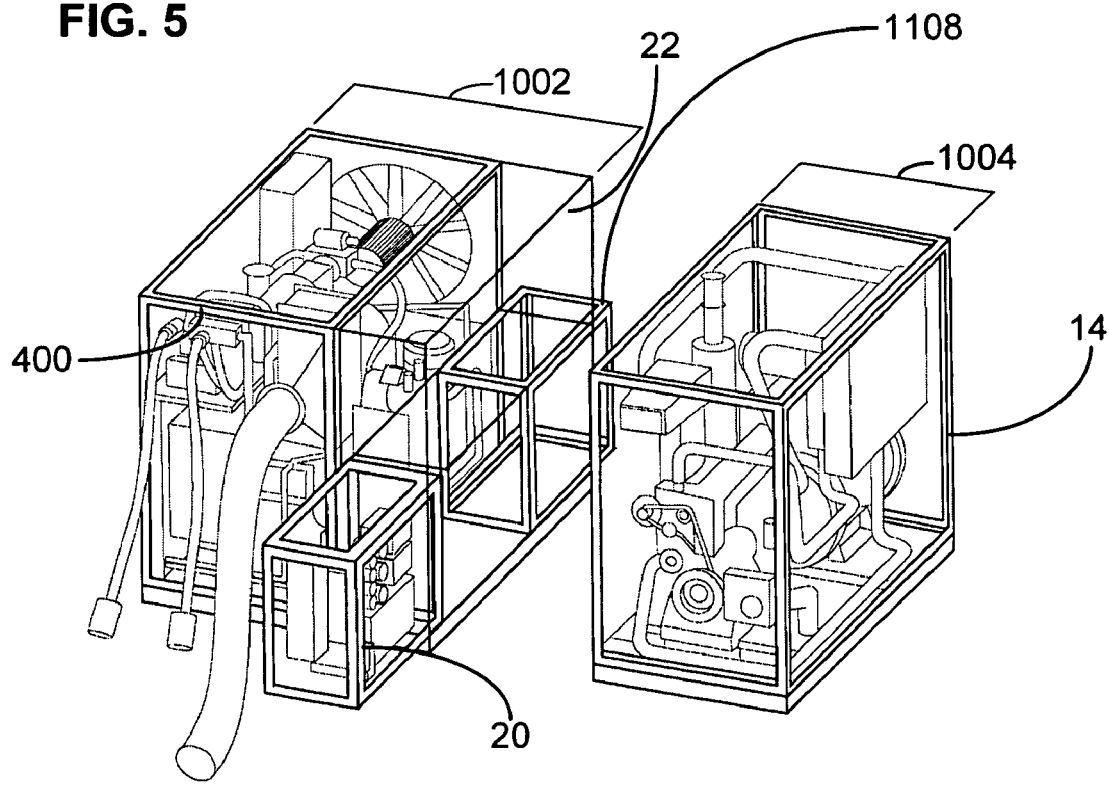
FIG. 5 is a perspective view of the modules shown in FIG. 4 but shown with the power generating module moved to the side and with electric power conversion module slid forward to illustrate ways in which the modules may be separated.

In FIG. 4, all of the modules 14, 20, 22, and 400 described above and carried by the cart 10 are shown occupying their normal positions within the cart 10. Occupying the rearmost portion of the cart 10 is a rectangular module containing airplane air conditioning components, the air conditioning module 400. This module 400 extends the full width of the cart 10, and the module 400 occupies approximately one-third to one-half of the length of the cart 10. Adjacent to the air conditioning module 400 is the removable rectangular module, the electrical power conditioning module 20. In FIG. 4, only the one electrical power converter module 20 is visible, but there is room for two such power converter modules 20 and 1308 on the cart 10, one positioned right behind the other, as shown in FIG. 5. Mounted adjacent to and above the electrical power converter module 20 is the cart 10's control system, the control system module 22. Attached to the front of the control system module 22 is the user-interface display 24 which is surrounded by pushbuttons 1302, 1304, 1316, and 1318 and status lights 1314 (see FIGS. 20, 22, and 23). These enable an operator to control all of the modules that are interconnected to the control system module 22. Adjacent to the electrical power conversion module 20 and occupying the front portion 1004 of the cart 10 is the large, rectangular module that contains all of the electrical power generating components—the power generating module 14. The power generating module 14 also occupies the full width of the cart 10. In FIG. 4, the two modules 20 and 22 are shown to be stacked vertically and sandwiched between the air conditioning module 400 and the power generation module 14.

FIG. 5 presents the same view as does FIG. 4, but the electrical power conversion module 20 is shown in FIG. 5 to be able to slide all the way out away from the cart 10 so that it may be easily serviced or removed. The second electrical power conversion module 1308 may also be arranged to slide all the way out from the cart 10 for servicing or removal. When removed from the cart 10, these power conversion modules 20 and 1308 may be used by themselves to supply power to airplanes in service hangers or to repair stations where airplane components need to be supplied with the correct flavor of electrical power.

FIG. 5 also reveals that the 4-wheel cart 10 may be split into two 2-wheel carts, a rear portion 1002 and a front portion 1004. The rear portion 1002 of the cart 10 carries the air conditioning module 400, the electrical power conversion module 20, the control module 22, and the second electrical power conversion module 1308 (visible in FIG. 5 but hidden from view in FIG. 4) which is positioned right behind the module 20. The front portion 1004 of the cart 10 carries the power generating module 14. When detached in this manner, the power generation module 14 on the front portion 1004 may be towed away and used elsewhere as a source of electrical power. If the rear portion 1002 is supplied with a suitable source of 360 to 500 volt, 50 or 60 cycle A.C., three-phase power supplied by the local airport power grid, it may be towed to airplanes and used to supply them with air conditioning, liquid coolant, and power conversion services.

FIG. 20 reveals that all of the modules 14, 20, 22, 400, and 1308 present on the cart 10 are networked together both for electrical power and also for electronic signaling between modules. FIG. 20 illustrates a CAN network 1312 that interconnects all of the modules for signaling purposes. This network 1312 is driven by a network bus driver 1310 mounted within the control module 22. The network 1312 permits monitoring signals and control signals to flow back and forth between the system control module 22 and the power generating module 14, the air conditioning module 400, and the two power conversion modules 20 and 1308. As will be explained below, when the two power conversion modules 20 and 1308 are slid into opposite sides of the cart 10, they are automatically connected to the network 1312 and to the electrical power bus of the cart 10. While not shown, network and electrical power connections can also be automatically established between the remaining modules 14, 22, and 400 when these modules are installed onto the front and rear portions 1002 and 1004 of the cart 10.

Figure 21:
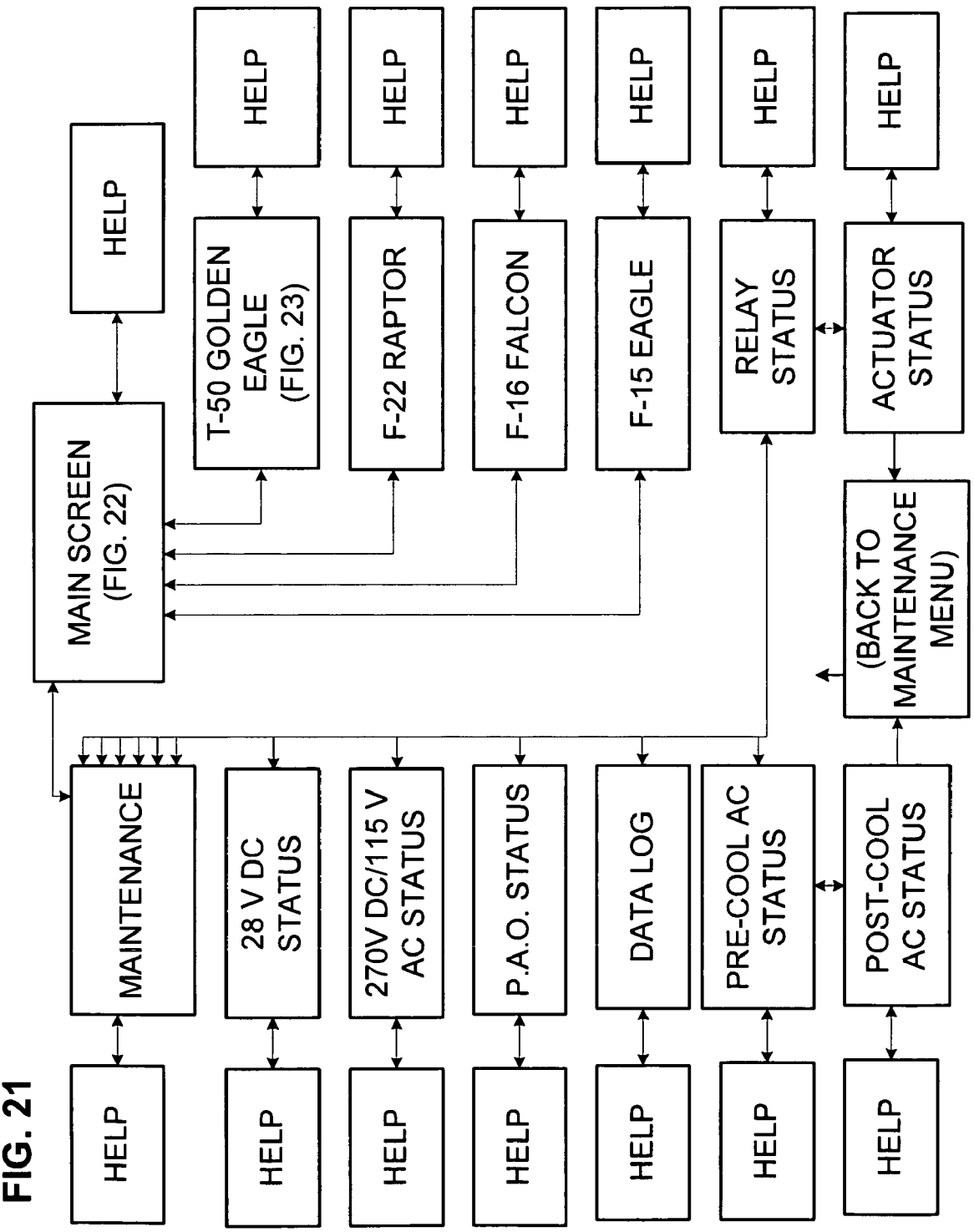
FIG. 21 is a block diagram illustrating one possible arrangement of the menus and submenus that may be displayed on the face of the control module's display, together with the navigation paths that exist between these menus and submenus.

FIG. 21 illustrates the array of different menus and submenus that may be selected by a user and displayed upon the display screen 24. An operator can use these menus and submenus to control the operation of all the modules on the cart 10. A main menu, shown in FIG. 22, enables one to select a particular type or class of airplane and to have all the modules on the cart 10 automatically configured to service the specialized needs of that particular type or class of airplane. A menu specific to the selected type or class of airplane (shown in FIG. 23) and related submenus then enable operators to view the status of the individual modules. A maintenance menu and related submenus (FIG. 21), reachable from the main menu (FIG. 22) by means of a special pushbutton actuation pattern known only to qualified service technicians, enables such technicians to view current, recent, and historical system parameters and to make adjustments to the operations performed by the various modules.

FIGS. 4 and 5 above illustrate that the cart 10 is designed so that it can be divided into a rear portion 1002 and a front portion 1004. The rear portion 1002 of the cart 10 contains and supports the air conditioning module 400, the electrical power converter modules 20 and 1308, and the control system module 22 with its graphical user-interface electroluminescent display 24. The front portion 1004 contains and supports just the power generating module 14. FIGS. 1, 4, and 13 illustrate these two portions of the cart 10 combined together, so that the cart 10 is a single, unitary cart. FIGS. 2, 3, 5, and 6-12 illustrate how the electrical power converter module 20 slides out and away from the rest of the cart 10. The module 20 may also be separated entirely from the cart 10 and operated in a stand-alone manner, wherever power conversion is required for airplanes or airplane components. FIGS. 2, 5, 14, and 15 illustrate the cart 10 split such that its two portions, 1002 and 1004, are separated and such that the power generating module 14 can be towed away and used elsewhere as a stand-alone, portable electrical power generator. The air conditioning module 400, electrical power converter module 20, and control system module 22 can then be towed separately to an airplane and used to provide air conditioning and electrical power services to the airplane, powered by electricity drawn from the local power grid (instead of from the power generating module 14).

One embodiment of the present invention allows the rear portion 1002 and the front portion 1004 (see FIGS. 3, 5, 14, and 15) of the cart 10 to be separated so they may stand apart (FIGS. 14 and 15). The rear portion 1002 (FIG. 14) contains deployable jack stands 1600 which, together with the 2-wheel-and-axle truck assembly 18 of the rear portion 1002, allow the rear portion 1002 to stand upright without additional support. The deployable jack stands 1600A extend telescopically downwards from underneath the rear portion 1002 and lock into place such that they support part of the weight of the rear portion 1002 and allow the rear portion 1002 to stand upright without additional support.

The front portion 1004 of the cart 10 also contains deployable jack stands 1602 (FIG. 15) which, together with the independent, steerable wheels 19 and 21 and their trucks 1418 and 1419 (FIGS. 15 and 19), allow the front portion 1004 to stand upright without external support.

When the cart 10 is assembled into a single cart 10, the rear portion 1002 and the front portion 1004 are attached together by means of bolts 1402 and nuts 1404 which bolt together abutting flat plates 1406 and 1408, as is shown in FIG. 13. The deployable jack stands are shown at 1600B and 1602B folded up into their horizontal rest positions. The front portion 1004 includes a hinge-mounted tow bar 1414 that is attached by a suitable hinge to a tow bar connector 1416 (FIGS. 13, 16, and 19). This tow bar connector 1416 is horizontally and pivotally bolted to two crossbars 1422 and 1424 (FIG. 19) that are themselves horizontally and pivotally bolted to the left and right front trucks 1418 and 1419 which carry the cart 10's two front wheels 19 and 21. The front trucks 1418 and 1419 are themselves pivotally attached by vertical shafts 1426 and 1428 to the bed of the cart 10 (removed from FIG. 19 for clarity). This arrangement forms a steerable towing arrangement for the 4-wheeled cart 10 that is suitable for use when the two portions 1002 and 1004 are bolted together, as is shown in FIG. 13, so that the cart 10 functions as a single, 4-wheel, steerable cart having a front tow bar that steers the cart 10's front wheels.

The 4-wheel cart 10 may be separated into two 2-wheeled carts: A rear portion 1002 that contains the air conditioner module 400, the control module 22, and the electrical power conversion modules 20 and 1308; and a front portion 1004 that contains the power generation module 14. To separate these portions, first the deployable jack stands 1600B and 1602B, shown in their horizontal rest positions in FIGS. 13 and 18, are rotated to their vertical active support positions, as shown at 1600A and 1602A in FIGS. 14, 15, and 17. Next, bolts 1402 and nuts 1404 are removed to allow the front and rear portions 1002 and 1004 to separate. One of the two portions 1002 and 1004 is then rolled or towed away from the other portion, as shown in FIGS. 14 and 15. Finally, two tow bars 1410 and 1412, which are pivotally mounted on vertical shafts extending from the flat plates 1406 and 1408, are rotated away from their rest positions parallel to the flat plates 1406 and 1408 into their towing positions perpendicular to the flat plates 1406 and 1408 with the tow bars 1410 and 1412 pointing away from the cart portions 1002 and 1004 and towards any vehicle that is going to tow one of the portions 1002 and 1004, as shown in FIGS. 14 and 15. As part of the cart 10 design process, the position of the wheels and trucks beneath the cart front and rear portions 1002 and 1004 is adjusted such that while there is some downwards force applied to the jack stands 1600A and 1602A, the wheels are close enough to the front-to-back center of gravity of the cart portions so that the downwards force applied to the jack stands is kept relatively small to enable the tow bars 1410 and 1412 to be lifted manually and placed upon the trailer hitch of a tow vehicle. Accordingly, the 4-wheel cart 10 may be broken into two stable 2-wheeled carts formed from the rear portion 1002 and the front portion 1004 of the cart 10, each portion having its own individual tow bar and foldable supporting jack stands.

FIG. 16 presents an exploded view of one of the jack stands 1600 and its mounting block components. FIG. 17, at 1600A, shows the assembled jack stand 1604 and its assembled mounting block shown locked in the vertical, load bearing position. FIG. 18, at 1600B, shows the assembled jack stand 1604 and its assembled mounting block 1626 shown locked in the horizontal, rest position.

With reference to these figures, the mounting block includes an upper plate 1620 the upper surface of which is mounted beneath the rear portion 1002 of the cart 10, as shown in FIGS. 13 and 14. An L-shaped block 1622 through which a hole has been drilled for the shaft of the jack stand 1604 has its upper surface attached to the upper plate 1620 shifted towards the center of the cart 10 so that the upper plate 1620 overhangs the block 1622 as shown. A side plate 1604 is attached to the right side of the block 1622 and abuts the upper plate 1620 as shown. A short beam 1618 having a square cross section and a length equal to that of the upper plate 1620 is attached to the elbow of the L-shaped block 1622 so that the two elements 1618 and 1622 form essentially a square, but with the tip of the beam 1618 facing the outside of the cart 10 extending beyond the block 1622, as shown.

The jack stand 1604 is shown in FIG. 16 to have an adjustable, extensible jack leg 1606 with a widened foot 1608 that spreads the weight applied to the ground beneath the cart 10's rear portion 1002. A set screw or bolt 1610 or a like mechanism locks the extensible jack leg 1606 into position such that the cart 10's rear portion is held level when the jack stand 1500 is in use. The jack stand's shaft is inserted through the hole in the L-shaped block 1622 towards the center of the cart 10. A spring 1616 is placed over the jack leg 1606 where it extends beyond the block 1622. The spring 1616 is compressed, and a cotter pin 1614 is inserted through a hole 1612 in the jack stand 1604 to hold the spring 1616 in place. This spring arrangement exerts a relatively strong force on the jack stand 1604, forcing it towards the center of the cart 10 at all times.

With reference to FIGS. 17 and 18, the mechanism just described is shown locking the jack stand 1604 in a horizontal, rest position at 1600B in FIG. 18 and in a load-bearing, vertical position at 1600A in FIG. 17. In both cases, the spring 1616 forces the jack stand 1604 into a grove formed by the elements 1618 and 1620 (FIG. 16) in FIG. 18 and by the elements 1618 and 1624 (FIG. 16) in FIG. 17, thereby locking the jack stand in position either horizontally or vertically. To alter the position of the jack stand 1604, one pulls the jack stand away from the cart 10 and rotates it 90 degrees and then releases it into one of the groves just described.

Figure 6:
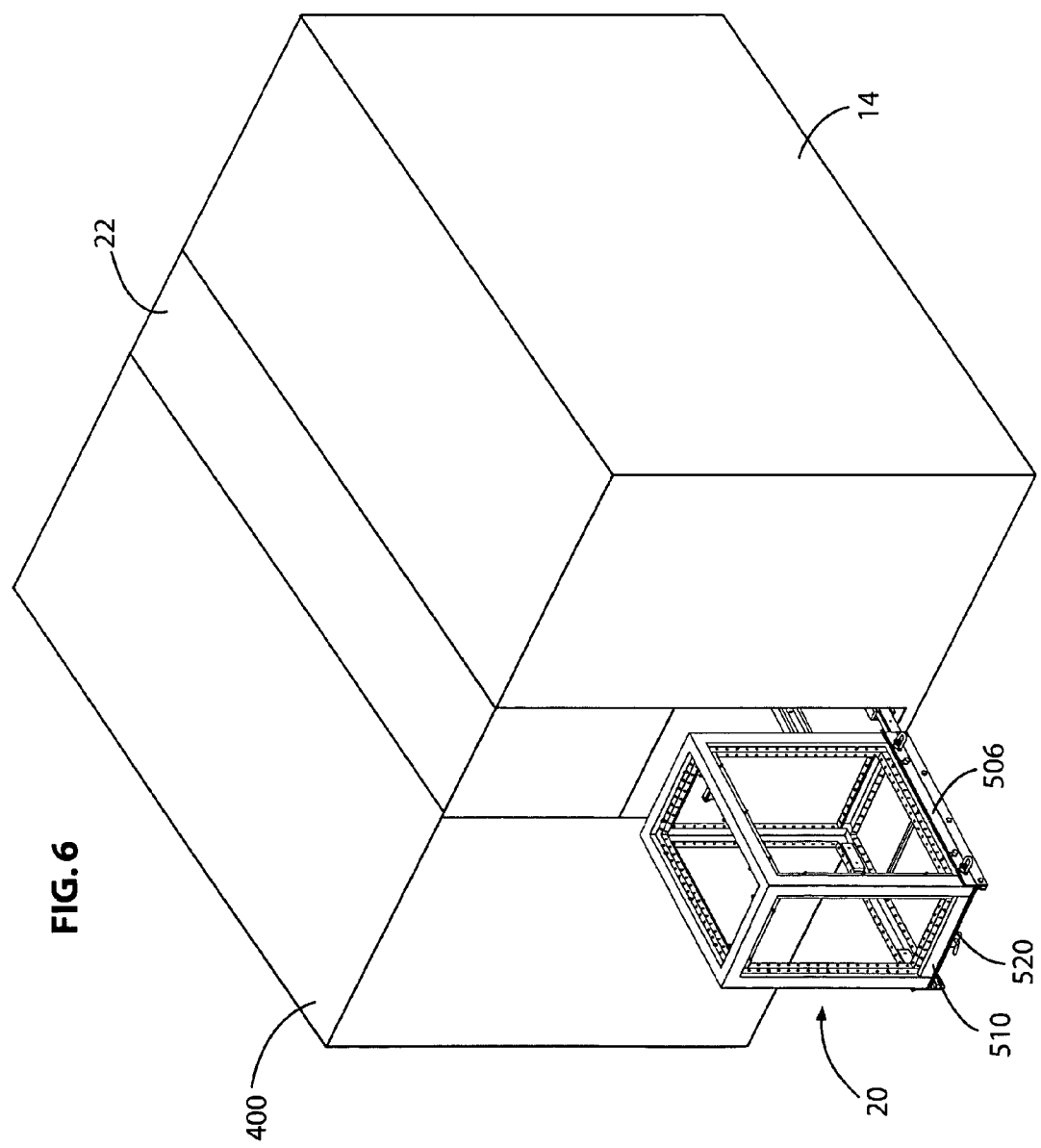
FIG. 6 is an isometric, simplified view of the modules shown in FIG. 4 with the electrical power conversion module shown slid forward and presented in a true-scale, detailed drawing.
Figure 7:
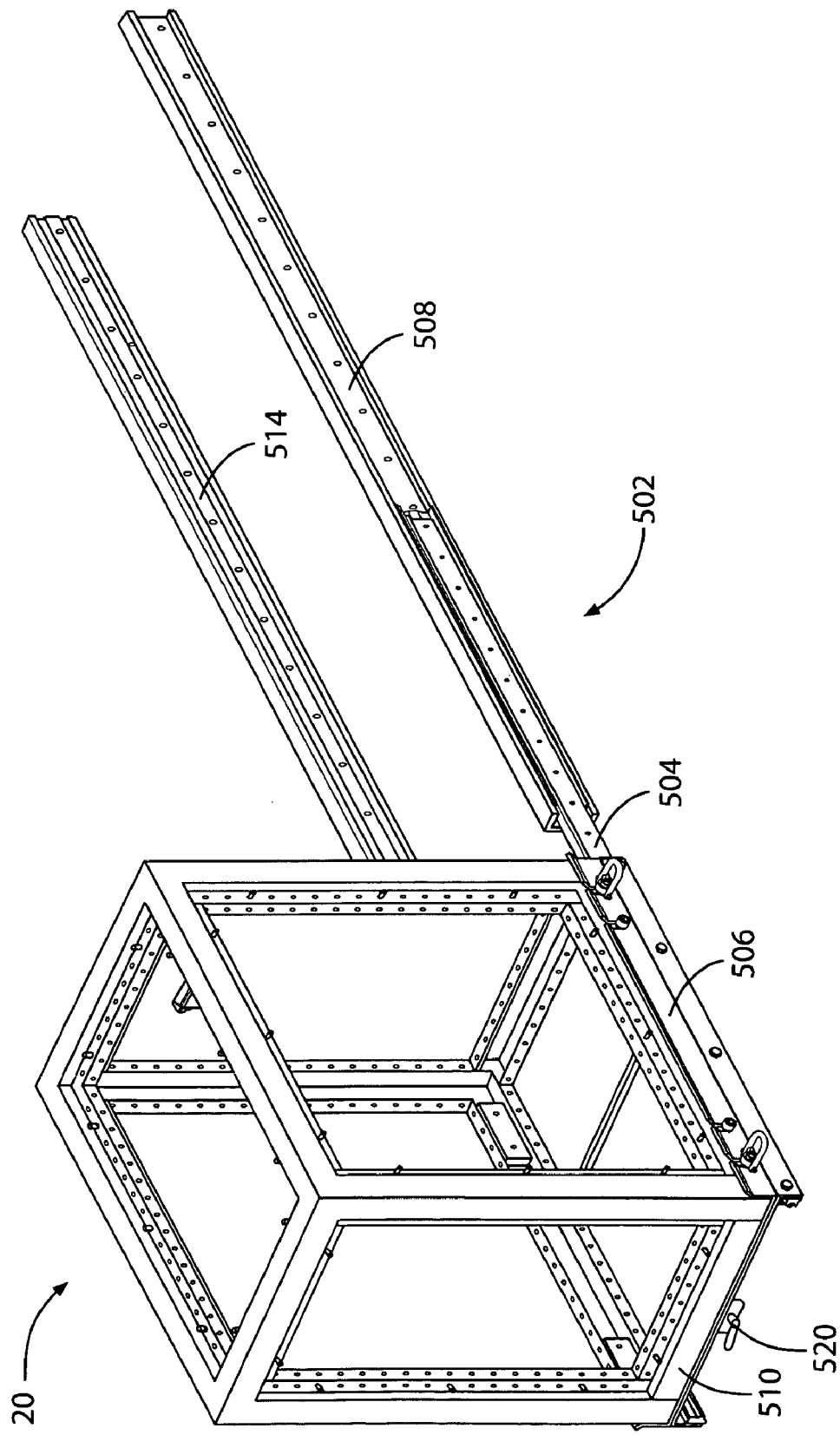
FIG. 7 is an isometric view of the electrical power conversion module shown resting on its rail/tray support system.

Referring now to FIG. 6, the rail/tray mounting system 502 that is used to support the electrical power converter modules 20 and 1308 is shown. The electrical power converter module 20 is designed to slide away from the side of the cart 10 and to be removed, and the rail/tray mounting system 502 is designed to make this possible. FIGS. 6 and 7 illustrate one possible design of the rail/tray mounting system 502.

The module 20 has rectangular frame 510 that rests upon the rail/tray mounting system 502. The system 502 supports the weight of the module 20 while permitting the module 20 to slide freely in and out of the cart 10. The rail/tray module system 502 includes: A module support tray 506 upon which the module 20's frame 510 rests; and two pairs of interlocking, telescopic rails 504-512 and 508-514. For example, these rails and the ball bearing assemblies that separate the rails and facilitate their sliding, telescopic motion may be obtained from G.S.F. Ltd., Shropshire, UK (part number TSQ43). The longer, fixed-position, supporting pair of rails 508 and 514 are attached to the cart 10 as shown and extend deep into the cart 10. The shorter pair of rails 504 and 512 are supported by the fixed-position rails 508 and 514 and arranged to slide in and out of the cart 10 by riding upon the fixed rails 508 and 514. The pair of rails 504 and 512 is attached to and provides support for the module support tray 506 which, in turn, supports the rectangular frame 510 of the power converter module 20.

Figure 10:
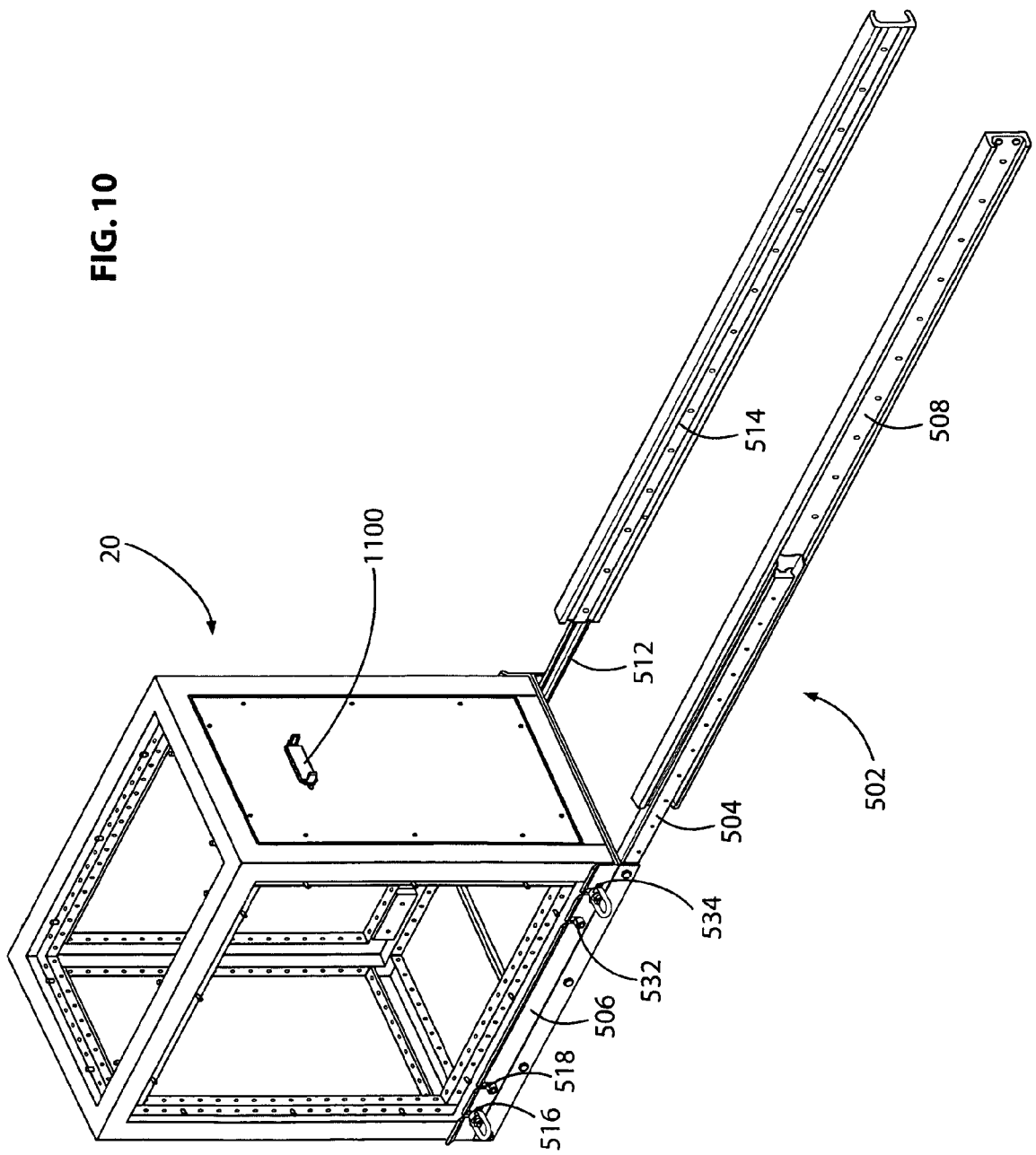
FIG. 10 is a rear and right-side isometric view of the electrical power conversion module and its rail/tray support system illustrating the rear electrical signal connector.
Figure 12:
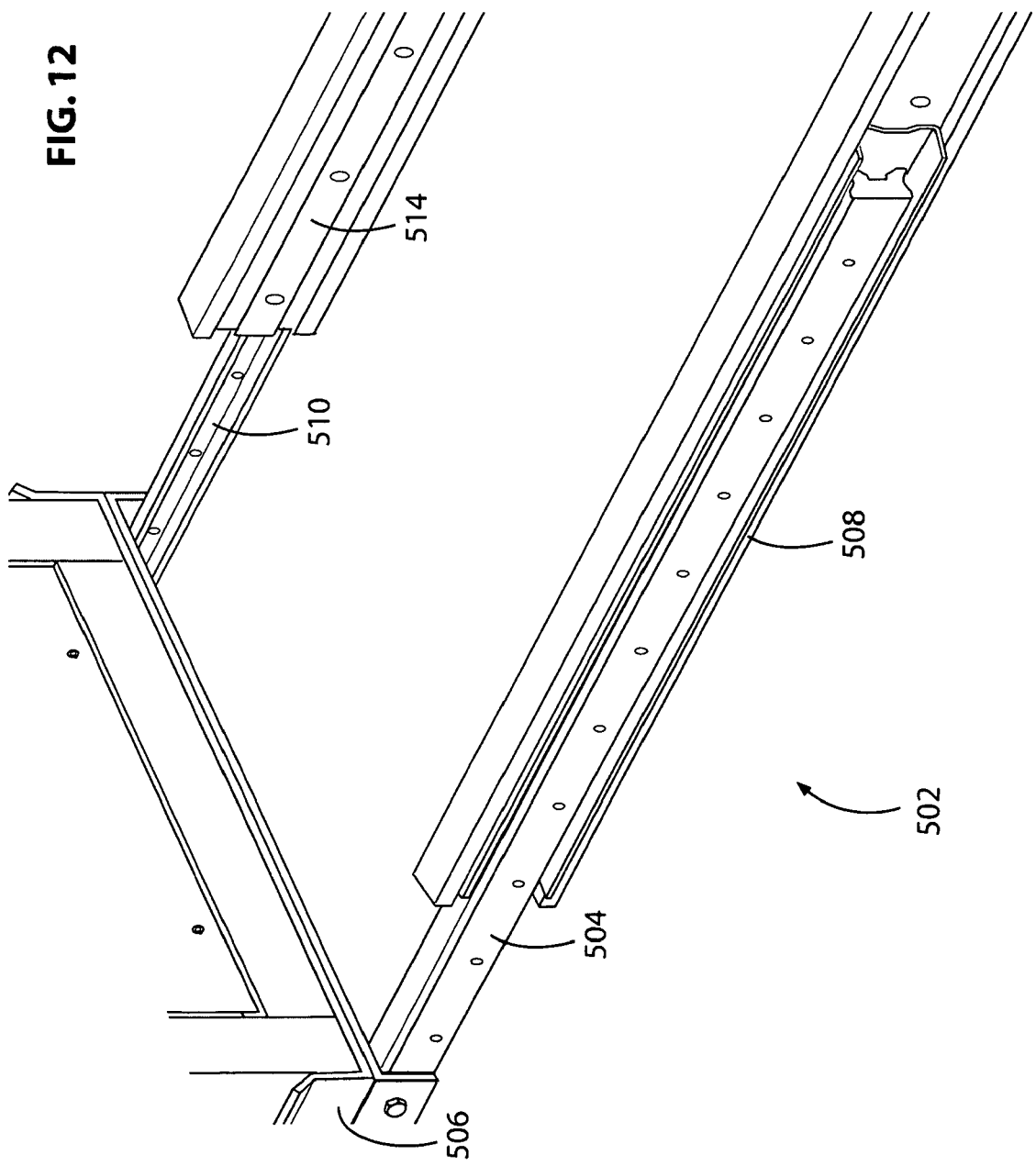
FIG. 12 is an enlarged view of the stationary rails mounted upon the cart to slideably support the interlocking, telescopic rails which support the tray that supports the electrical power conversion module.

As is best shown in FIGS. 10 and 12, the rail 504 slides freely within the support of fixed rail 508, and the rail 510 slides freely within the support of fixed rail 514.

Figure 8:
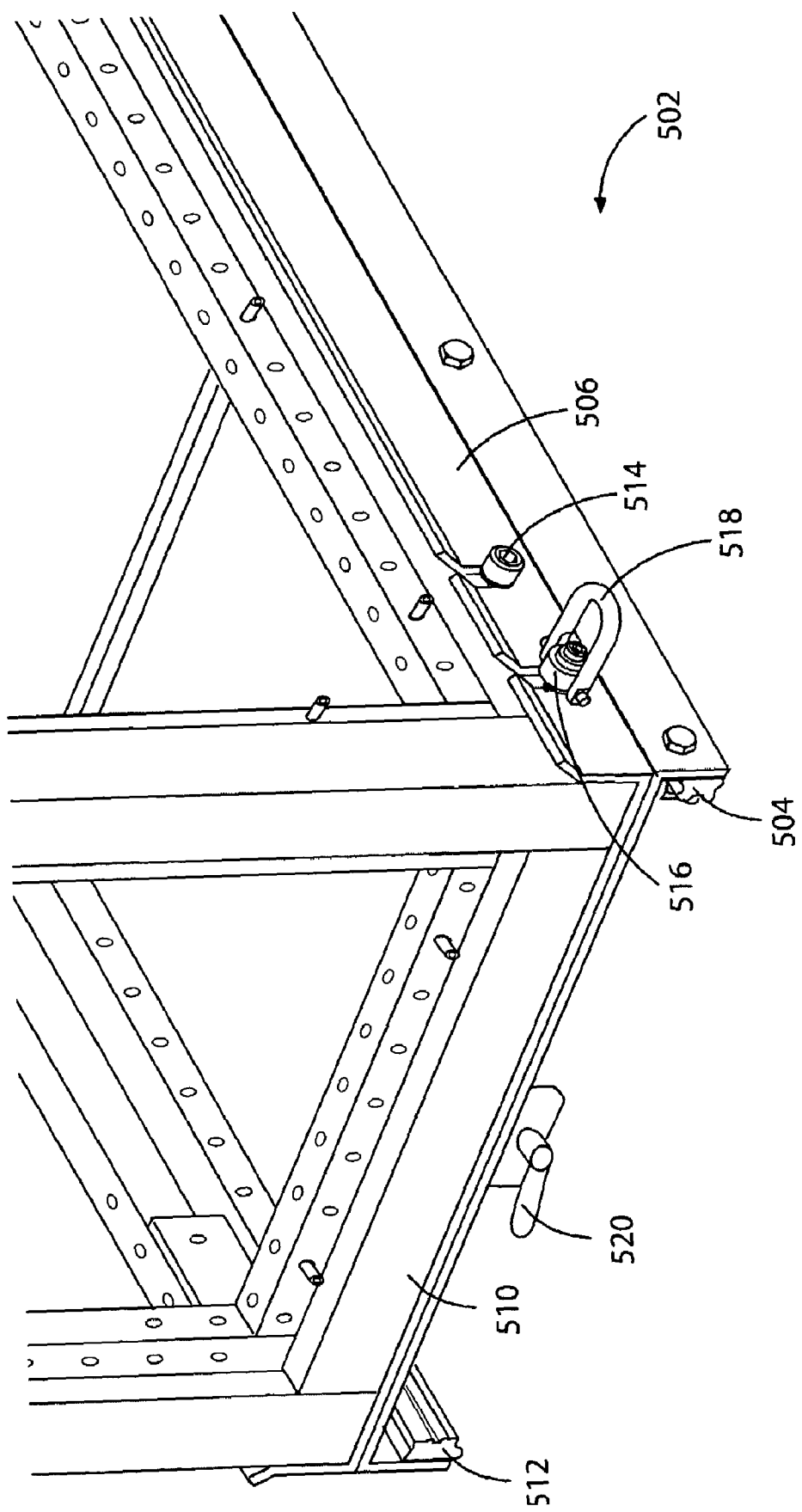
FIG. 8 is an enlarged, isometric view of the front right lower corner of the electrical power conversion module shown in FIG. 7 and its rail/tray support system.

Referring now to FIGS. 7 and 8, detailed views of the frame 510 and the rail/tray mounting system 502 are shown. The tray 506 has a tapered upper edge which assists one in placing the frame 510 of the module 20 upon the tray 506. The tray 506 is attached to the outer surfaces of the two supporting rails 504 (FIGS. 7 and 8) and 512 (FIG. 8). In turn, the rails 504 and 512 slide within the corresponding rails 508 and 514, each of which has a C-shaped cross-section. Rollers (not shown) attached to the rails 504 and 512 roll along the upper and lower inner surfaces of the C-shaped cross-section of the rails 508 and 514, thereby facilitating the rolling of the module 20 into and out of the body of the cart 20.

Figure 9:
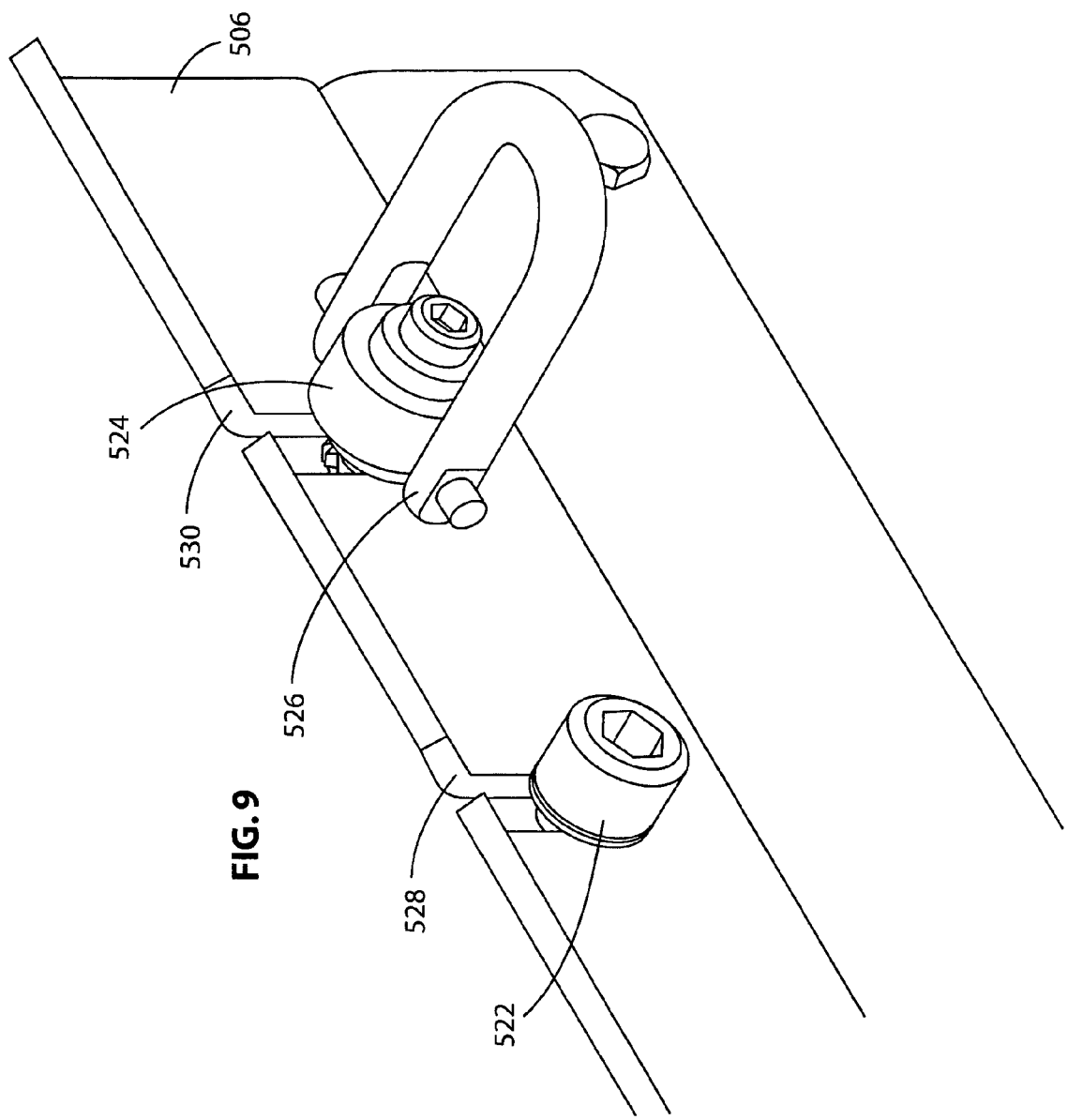
FIG. 9 is an enlarged, isometric view of the front left lower side corner of the electrical power conversion module shown in FIG. 7 and its rail/tray support system illustrating the fasteners that attached the power conversion module to the supporting tray.

FIGS. 8 and 9 illustrate that bolts 514, 516, 522, 524, 532, and 534 screwed into the frame 510 of the module 20 are provided to hold the module 20 firmly attached to the tray 506. Notches 528 and 530 in the vertical edges of the tray 506 are provided so that the bolts 514, 516, 522, 524, 532, and 534 do not need to be removed entirely from the module 20 when it is removed from the tray 506. When the module 20 is placed into the tray 506, the bolts 514, 516, 522, 524, 532, and 534 slide down into the notches 528 and 530, and then the bolts 514, 516, 522, 524, 532, and 534 may be screwed tight using a hexagonal headed driver tool. To facilitate lifting of the module 20, substitute bolts having U-shaped lifting hooks 518 and 526 may be installed, as is shown in FIGS. 8 and 9. These hooks 518 and 526 are stowed away when the module 20 is pushed into the cart 10.

A rotating locking handle 520 is attached to the front, bottom of the tray 502. When rotated, the handle 520 applies brakes (not shown) against the inside surfaces of the stationary rails 508 and 514 to lock the module 20 to the stationary rails 508 and 514 and thereby to lock it to the cart 10 and prevent the module 20 from sliding. This tool-less locking mechanism is used to prevent the removable electrical power conditioning module 20 from sliding in or out of the cart 10 at unexpected times. The locking mechanism locks the removable electrical power converter module 20 into place when it is located fully into the cart 10, as in FIGS. 1 and 4, or slid partly or fully out from the cart 10 as in FIGS. 2 and 5. This locking mechanism prevents the removable electrical power converter module 20 from sliding around inside the cart 10 as the cart 10 is transported. This locking mechanism locks the electrical power converter module 20 into place when it is being serviced in the fully out position on the cart, or being prepared for module extraction.

Figure 11:
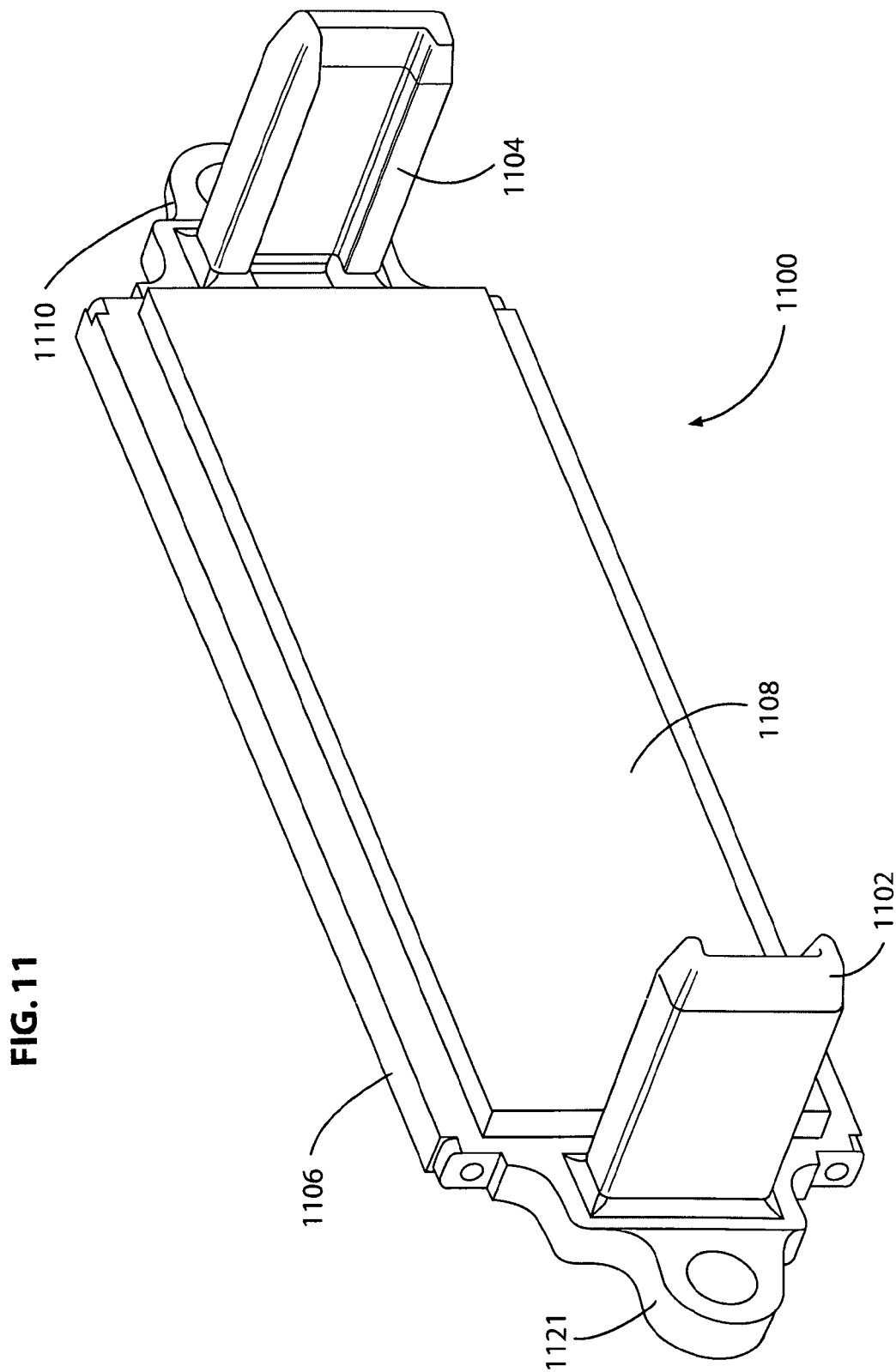
FIG. 11 is a blown-up, isometric view of the electrical power conversion module's rear electrical power and signal connector, illustrating its fingers that engage a matching socket to keep any electrical connectors aligned when the module is inserted into the cart.

The present invention also includes a blind mating connector unit 1100 for supplying power and signals to the electrical power converter module 20, as is shown in FIGS. 10 and 11. This blind mating connector unit 1100 allows the module 20 to be installed in the cart 10 without the need for the manual establishment of additional wire connections to supply electrical power and network signals to the power converter module 20. This will also assure that there is no power supplied to the power converter module 20 when it is in the fully out position before being serviced by maintenance personnel or electronic technicians. In addition, this eliminates the need for wiring should a second or a replacement power module be added to the cart.

With reference to FIG. 11, the blind mating connector unit 1100 has a mounting plate 1106 that is mounted to the back surface of the module 20 as shown in FIG. 10. It is mounted by means of bolts and nuts using the mounting brackets 1110 and 1121. Alignment pins 1102 and 1104 engage recesses in a complementary blind mating connector unit (not shown) mounted within the cart 10 to engage the unit 1100 whenever the module 20 is pushed fully into the cart 10. A plate 1108 is provided upon which various power and electronic signal connectors may be mounted, and a similar plate (not shown) mounted upon the complementary connector unit (not shown) within the cart 10 Is provided to support matching but opposite-sex power and electronic signal connectors that feed power and signals to the interior of the cart 10 and to the remaining modules. Similar connector arrangements may be used to supply power and signals to the remaining cart 10 modules.

Referring now to FIG. 20, the control system module 22 is illustrated. The control system module 22 contains the display 24 that allows an operator to control the various modules on the cart, communicating over a CAN bus 1312. Using the display 24 and the pushbuttons 1302, 1304, 1316, and 1318 and the signal lights 1314 and also the menus and submenus illustrated in FIGS. 21 to 23, an operator can configure the air conditioning module 400, the electrical power converter modules 20 and 1308, and the power generating module 14 based on the particular type or class of airplane the cart 10 is to service, as selected on the main menu shown in FIG. 22 and the airplane-specific submenu shown in FIG. 23. In one embodiment of the present invention, interconnectivity is accomplished by means of plug-in connectors of the type just described such that a module 14, 20, 22, 400, and 1308 is automatically plugged into a power supply bus (not shown) and into the CAN bus 1312 whenever the module is mounted upon the cart 10. The power supply bus and the CAN bus 1312 connection between the front portion 1002 and the rear portion 1008 can be similarly established automatically whenever the two halves of the cart 10 are bolted together. Other alternative networking systems, such as Ethernet or Token Ring, may be used instead of a CAN bus to accomplish interconnectivity of the modules.

While an embodiment of the invention has been disclosed, numerous modifications and changes will occur to those skilled in the art to which this invention pertains. The claims annexed to and forming a part of this specification are intended to cover all such embodiments and changes as fall within the true spirit and scope of the present invention.

What is claimed is:

1. A ground support equipment cart containing one or more removable equipment modules comprising:
  a ground support equipment cart;
  a rectangular module containing airplane air conditioning components mounted upon said cart and extending the width of the cart but occupying substantially less than half of the cart's length;
  one or more rectangular equipment modules removably mounted upon said cart, at least one removable module containing electrical power conversion components;
  a rectangular module containing power generating components mounted upon said cart and occupying substantially the remainder of said cart; and
  a rail-tray system that accommodates the weight of at least one removable, slideable mounted module, said rail-tray system securing said removable modules to said cart.

2. A ground support equipment cart in accordance with claim 1 which further comprises a locking mechanism that locks at least one removable, rail-tray system slideable mounted module in place.

3. A ground support equipment cart in accordance with claim 1 wherein said removable modules, when used separately from said cart, are able to receive input power cables of the same type that said ground support equipment cart is able to receive.

4. A ground support equipment cart in accordance with claim 1 wherein said removable modules are mounted adjacent to said module containing airplane air conditioning components.

5. A ground support equipment cart in accordance with claim 1 which further comprises a control system rectangular module having a display and controls for at least two of said other modules and interconnected to said at least two of said other modules by power and signal networking connections.

6. A ground support equipment cart in accordance with claim 5 wherein the control system module provides a display and controls and is interconnected to the module containing air conditioning components and at least one module containing electrical power conversion components when that module is not removed.

7. A ground support equipment cart in accordance with claim 6 wherein the control system module also provides a display and controls and is interconnected to the module containing power generating components by power and signal networking connections when that module is not removed.

8. A ground support equipment cart in accordance with claim 1 wherein said cart comprises a first portion of said cart supporting one or more modules and a second portion of said cart supporting one or more modules, said first portion being separable from the remainder of said cart.

9. A ground support equipment cart in accordance with claim 8 wherein said first portion supports said module containing power generating components.

10. A ground support equipment cart in accordance with claim 8 wherein said second portion comprises said rectangular module containing airplane air conditioning components as well as other removable modules.

11. A ground support equipment cart in accordance with claim 8 wherein the ground support equipment cart comprises a cart first and second portion separating mechanism, said separating mechanism providing resistance to bending during transportation of said cart when said first portion and said second portion are not separated.

12. An airplane ground support equipment cart containing one or more removable equipment modules comprising:
- a ground support equipment cart;
- a rectangular module containing airplane air conditioning components mounted upon said cart and extending the width of the cart but occupying substantially less than half of the cart's length;
- one or more rectangular equipment modules removably mounted upon said cart, at least one removable module containing electrical power conversion components;
- a rail-tray system mounted on said cart with a mechanism for securing said at least one removable module in place; and
- a rectangular module containing power generating components mounted upon said cart and occupying substantially the remainder of said cart.

13. A ground support equipment cart in accordance with claim 12 wherein the ground support equipment cart occupies a footprint of no more than one pallet position on an air transport cargo airplane.

14. A ground support equipment cart in accordance with claim 12 wherein at least one of said removable modules is slideable so that it may be slid entirely away from said cart for service and maintenance purposes.

15. A ground support equipment cart in accordance with claim 14 which further comprises a locking mechanism that locks at least one removable, slideably mounted module in place.

16. A ground support equipment cart in accordance with claim 12 wherein said removable modules, when used separately from said cart, are able to receive input power cables of the same type that said ground support equipment cart is able to receive.

17. A ground support equipment cart in accordance with claim 12 wherein said removable modules are mounted adjacent to said module containing airplane air conditioning components.

18. A ground support equipment cart in accordance with claim 12 which further comprises a control system rectangular module having a display and controls for at least two of said other modules and interconnected to said at least two of said other modules by power and signal networking connections.

19. A ground support equipment cart in accordance with claim 12 wherein said cart comprises a first portion of said cart supporting one or more modules and a second portion of said cart supporting one or more modules, said first portion being separable from the remainder of said cart.

20. A ground support equipment cart in accordance with claim 19 wherein the ground support equipment cart comprises a cart first and second portion separating mechanism, said separating mechanism providing resistance to bending during transportation of said cart when said first portion and said second portion are not separated.

* * * * *